(12) United States Patent
Guntipalli

(10) Patent No.: US 11,514,118 B2
(45) Date of Patent: Nov. 29, 2022

(54) MANAGING DIGITAL EVENTS, AFFINITIES, DIGITAL QUERIES, AND PRIVATE DIGITAL CLIP NOTES ACROSS CLIENT DEVICES FOR AN AFFINITY NETWORKING SYSTEM

(71) Applicant: Singular Technology Group LLC, Maple Grove, MN (US)

(72) Inventor: Bala Guntipalli, Maple Grove, MN (US)

(73) Assignee: Singular Technology Group LLC, Maple Grove, MN (US)

(*) Notice: Subject to any disclaimer, the term of this patent is extended or adjusted under 35 U.S.C. 154(b) by 151 days.

(21) Appl. No.: 16/829,320

(22) Filed: Mar. 25, 2020

(65) Prior Publication Data

US 2021/0303646 A1  Sep. 30, 2021

(51) Int. Cl.
| | |
|---|---|
| *G06F 16/9535* | (2019.01) |
| *H04L 9/08* | (2006.01) |
| *G06F 21/60* | (2013.01) |
| *G06F 21/62* | (2013.01) |

(52) U.S. Cl.
CPC ........ *G06F 16/9535* (2019.01); *G06F 21/602* (2013.01); *G06F 21/6227* (2013.01); *H04L 9/0825* (2013.01)

(58) Field of Classification Search
CPC ............... G06F 16/9535; G06F 21/602; G06F 21/6227; G06F 21/6218; H04L 9/0825; H04L 9/0897; H04L 63/10; H04L 63/044
See application file for complete search history.

(56) References Cited

U.S. PATENT DOCUMENTS

| | | | | |
|---|---|---|---|---|
| 7,921,167 B2* | 4/2011 | Shroff | ................... | G06Q 50/01 709/206 |
| 9,367,631 B2* | 6/2016 | Hern | ................... | G06F 21/6218 |

OTHER PUBLICATIONS

Henze, The Cloud Needs Cross-Layer Data Handling Annotations, pp. 18-22 (Year: 2013).*

* cited by examiner

*Primary Examiner* — Albert M Phillips, III
(74) *Attorney, Agent, or Firm* — Keller Preece PLLC

(57) ABSTRACT

The present disclosure relates to systems, methods, and non-transitory computer readable media for an affinity networking system. In particular, the disclosed systems can determine and facilitate event-centric digital association among users and other entities (e.g., companies) based on event information, user profile information, company information, and private digital clip notes maintained for individual users. In addition, the disclosed systems can generate a digital event (e.g., for a seminar or a convention for users to attend) and can manage registration for the event based on user interactions via client devices. Further, the disclosed systems can enable a client device to create searchable private digital clip notes for co-users, events, or other entities.

20 Claims, 19 Drawing Sheets

MANAGING DIGITAL EVENTS, AFFINITIES, DIGITAL QUERIES, AND PRIVATE DIGITAL CLIP NOTES ACROSS CLIENT DEVICES FOR AN AFFINITY NETWORKING SYSTEM

BACKGROUND

Recent years have seen significant technological advances in online networks for managing and exchanging digital information between client devices. For example, with regard to conventional social networking systems, client devices can generate accounts to access digital information published from other client devices, share digital content to accounts of other client device, and connect with other client device users across computer networks. Similarly, conventional social networking systems can provide search functionality to identify users of client devices within the online social networking system.

Despite these advances however, conventional systems have a number of technical disadvantages in relation to flexibility, security, and efficiency of implementing computer systems. For example, in managing digital contacts (e.g., business associates or friends) and corresponding digital content, many conventional systems rigidly provide access to limited profile information and shared digital media associated with contact accounts, per accessibility restrictions set by the individual contacts. Accordingly, these systems rigidly store, manage, and disseminate limited digital information regarding client devices and corresponding co-users. Indeed, the inflexibility of conventional systems has led many users to turn away from such systems in managing digital information. For example, despite recent advances, the technological shortcomings of conventional systems have forced individuals to continue printing, passing along, and managing paper business cards when attending events. In short, conventional systems fail to provide the flexibility and functionality needed to accurately maintain and distribute digital data across client devices.

The rigidity of conventional systems also leads to a variety of inefficiencies. For example, because of the inflexible approach just discussed, conventional systems often lead users to utilize multiple different applications and services to store, manage, and access digital content regarding other users. For example, it is not uncommon for client devices to utilize one application to identify upcoming digital events while utilizing another application to maintain digital contacts and utilizing another application to record digital notes. Thus, these conventional systems require significant user interaction to navigate between a variety of different applications. In addition, many conventional systems require users to navigate through multiple interfaces and/or applications to access desired data or functionality. Processing the numerous user interactions and computer functions required to navigate between interfaces and applications consumes excessive computing resources such as processing power and memory.

Furthermore, as mentioned above, the rigidity and inefficiency of conventional systems often leads users to abandon these systems, reverting to other time consuming, inefficient, and computationally expensive approaches. For example, as mentioned, some users resort to printing, distributing, and collecting business cards to exchange information. Even after this inefficient process, scanning systems require significant time and resources to digitize these cards. Indeed, after returning from a conference, it is not uncommon for users to utilize scanning systems to individually scan hundreds of business cards, and then once scanned, interact with the digitized cards to extract, import, and correct digital information into client devices. This approach again requires a number of user interfaces, extensive user interaction, significant processing and storage resources, and excessive time.

In addition, many conventional social networking systems are also insecure. In particular, conventional systems often store digital data (e.g., profile information or other searchable digital content) on a server for access via search queries. For example, in response to a query from a client device, a conventional system accesses relevant profile information about user accounts stored on a server and provides the information from the server to the client device. Thus, even accounting for privacy restrictions set by individual accounts, these conventional systems maintain information using servers accessible by a wide range of client devices associated with various user accounts. Moreover, even conventional systems that utilize some sort of encryption process often expose digital data to server-level data breaches, in as much as back-end administrator devices can access pertinent keys to decrypt the data. Indeed, in the current digital milieu, digital privacy breaches are commonplace with respect to digital information stored on remote servers via these conventional systems.

Thus, there are several disadvantages with regard to conventional systems for managing and disseminating digital content to user devices across computer networks.

SUMMARY

One or more embodiments described herein provide benefits and solve one or more of the foregoing or other problems in the art with systems, methods, and non-transitory computer readable media that can flexibly, efficiently, and securely identify, store, and disseminate digital content across client devices in managing digital events, affinities, digital queries, and private, context-specific digital clip notes. For example, the disclosed systems can create, manage, and register for digital events; collect, store, and search private digital clip notes linked to digital events, entities, and co-users; track digital context as users interact with digital events, entities, and co-users over time; dynamically identify digital affinities in relation to co-users, entities, events, and client devices in performing digital search queries based on user interactions and private digital clip-notes; provide targeted digital content to individual client devices based on digital events, connections to co-users and other entities, and private digital clip notes; and securely encrypt digital content via in-app symmetric encryption processes and/or asymmetric encryption process that utilize multiple encrypting keys stored on separate servers and data management systems.

To illustrate, the disclosed systems can generate user interfaces for creating, managing, and registering for digital events and managing profiles for, or interacting with, co-users and other entities. Furthermore, the disclosed systems can provide, within these user interfaces, clip note elements selectable for entering private digital clip notes associated with the digital event, the entities, and/or co-users of the disclosed systems. Based on user interaction with the clip note elements, the disclosed systems can receive private digital clip notes and encrypt them using a first encryption key stored on a first server (e.g., an encryption and encrypted data storage system). Furthermore, the disclosed systems can retrieve and search the digital clip notes utilizing with a second encryption key stored on an isolated second server (e.g., a decryption and search system). Utilizing this decrypted information, the disclosed systems can perform digital search queries based on decrypted private digital clip notes, digital event information, and digital profiles (for co-users and entities), building query responses to reflect digital context of interactions between users/client devices over time. Moreover, the disclosed systems can determine affinities between users/client devices and between users/client devices and other entities based on private digital clip notes, digital event registrations, and digital profiles to generate query responses, suggest digital events/co-users, and/or to provide targeted digital content to client devices.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 5C illustrates an example event interface in accordance with one or more embodiments;

FIG. 5D illustrates an example registration interface in accordance with one or more embodiments;

DETAILED DESCRIPTION

Figure 1:
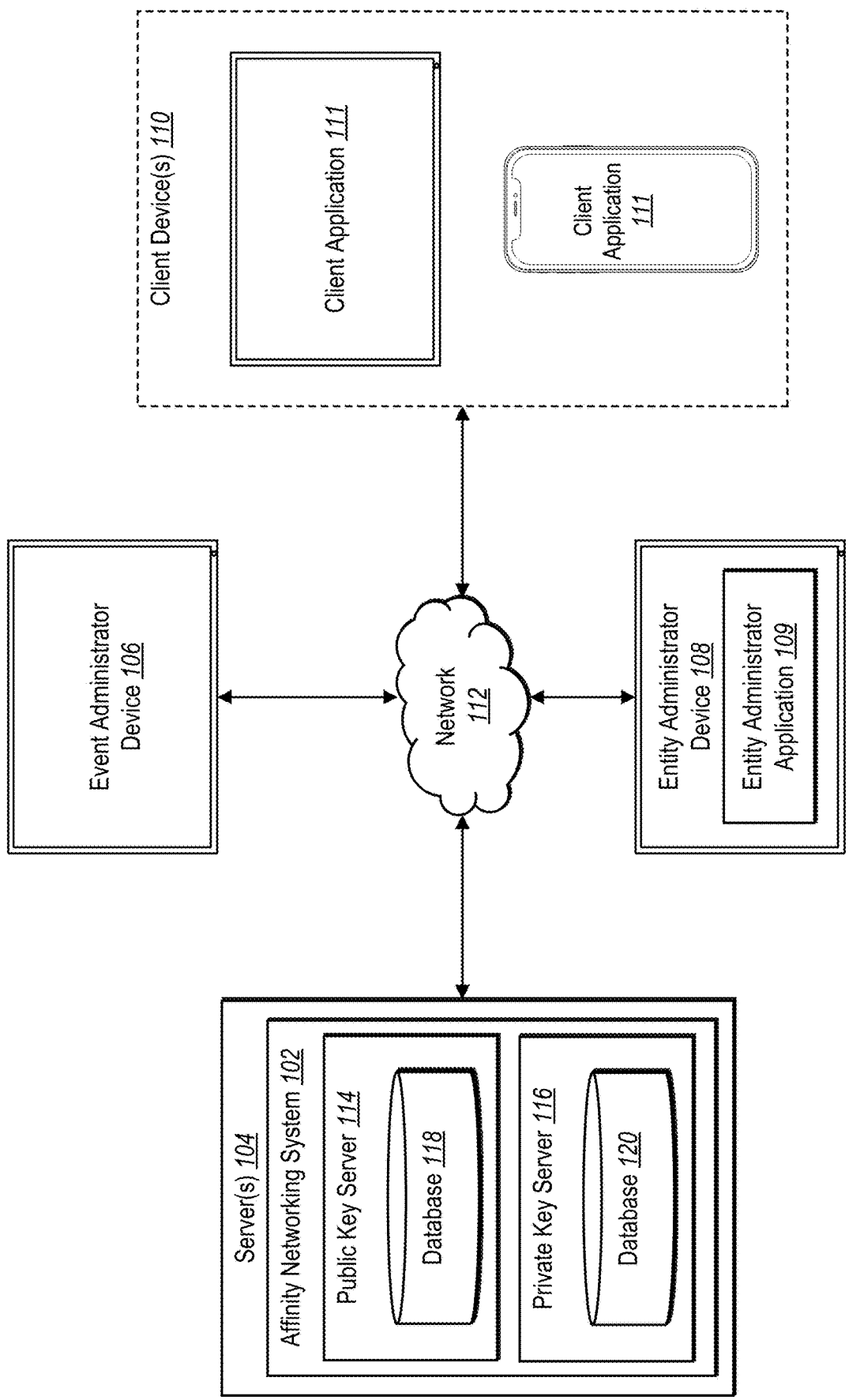
FIG. 1 illustrates an example system environment for implementing an affinity networking system in accordance with one or more embodiments.

One or more embodiments described herein include an affinity networking system that can flexibly, securely, and efficiently manage digital events, affinities, digital queries, and private digital clip notes across client devices. For example, the affinity networking system can create and manage digital events and provide user interfaces at client devices for registering for digital events and collecting private digital clip notes associated with co-users, events, or entities. In addition, based on user interaction with clip note elements within these or other user interfaces, the disclosed systems can manage, store, and search private digital clip notes corresponding to digital events, entities, and co-users. Furthermore, over time, the affinity networking system can dynamically identify digital affinities based on user interactions and private digital clip-notes in relation to co-users and client devices. The affinity networking system can also perform digital search queries based on private digital clip-notes and other monitored interactions to facilitate digital interaction between client devices. Indeed, the affinity networking system can even manage intra-entity queries to identify users that satisfy query criteria based on user profiles and/or digital clip notes. Furthermore, the affinity networking system can provide targeted digital content to individual client devices based on digital events, connections, and private digital clip notes. In addition, the affinity networking system can securely encrypt, store, decrypt, and search digital content via end-to-end, in-app symmetric encryption and/or asymmetric encryption utilizing multiple encryption keys stored on separate servers to improve security of private digital clip notes and other digital content.

As just mentioned, in some embodiments, the affinity networking system creates digital events and provides a user interface for researching and registering for the event within a single, centralized application. To illustrate, the affinity networking system can register user and entity accounts (e.g., when client or administrator devices download a corresponding application). Thereafter, based on user interaction with an administrator device, the affinity networking system can generate a digital event (e.g., identify event details, such as time, location, topic, presenters, etc.). Moreover, based on user interaction with a client device, the affinity networking system can register users for various digital events and/or with various entities such as organizations, chambers, associations, or service clubs.

For example, as mentioned, the affinity networking system can generate and provide one or more interfaces for display on a client device. Among other interfaces, the affinity networking system can generate an event summary interface that includes digital event cards summarizing information associated with digital events. The affinity networking system can also receive a user interaction with a registration element within the event summary interface (e.g., within a particular digital event card) to register the user for the event. Based on registering the user for the event, the affinity networking system can also generate an event member interface that includes digital co-user cards that depict profile information for respective co-users registered for the event.

The affinity networking system can provide a variety of interactive elements via an event summary interface and/or an event member interface. For example, the affinity networking system can provide a clip note element (together with a registration element) within a digital event card shown within the event summary interface. Similarly, the affinity networking system can provide a clip note element within a digital co-user card shown within the event member interface. Based on user interaction with the clip note element, the affinity networking system can generate a private digital clip note contextually linked with either a co-user and/or a digital event. For example, the affinity networking system can generate a private digital clip note that includes tags or other information pertaining to a co-user, an entity, or an event.

The affinity networking system can further store private digital clip notes (and other digital content) created by the user within a database. To secure digital content, such as the private digital clip notes, the affinity networking system can implement an asymmetric encryption process that utilizes multiple encryption keys maintained by isolated/separate systems (e.g., servers). For example, in some embodiments, the affinity networking system encrypts private digital clip notes using a public key specific to a user. Indeed, the affinity networking system can generate a public key for the user based on user registration with the affinity networking system. Thus, the affinity networking system can encrypt the private digital clip notes and store them within a database for access at a later time (e.g., via a search).

In addition to the public key, the affinity networking system can also generate a private key specific to the user (e.g., upon registration with the affinity networking system). In some embodiments, the affinity networking system generates the private key and stores the private key on a different database, separate from the database where the public key and/or the private digital clip notes are stored. In response to a search query, the affinity networking system can transmit encrypted digital content to the second server/system storing the private key. Via the second server, the affinity networking system can perform a stateless decryption and search of the encrypted private digital clip notes. In some embodiments, the affinity networking system decrypts and searches the private digital clip notes in parallel utilizing multiple worker nodes to efficiently and securely search and provide digital content.

In addition, or in the alternative, the affinity networking system can also implement an end-to-end encryption process, where encryption keys are not stored or processed even on remote servers or databases. For example, the affinity networking system can utilize in-app encryption with a key stored at one or more client devices to encrypt and decrypt private digital clip notes or other sensitive data. To illustrate, the affinity networking system can utilize a key stored within a browser (or other application) on a client device to encrypt digital data before it is transmitted to a remote server. The affinity networking system can then pass the encrypted data back to the client (via the browser) for decryption, processing, and search at the client device. In this manner, the affinity networking system can also utilize a symmetric encryption approach to provide end-to-end encryption security (where unencrypted data is not available at any remote server) while still providing search functionality.

The affinity networking system can monitor interactions across client devices over time to determine digital affinities or connections between users/client devices. Indeed, as users and entity administrators manage and update respective accounts and interact with co-users, other entities, and digital events within the affinity networking system application, the affinity networking system can determine affinities associated with (or between) various users, entities, and events. For example, the affinity networking system can determine an affinity between a user and a co-user who register for a common event. In some embodiments, the affinity networking system determines an affinity between a user and an entity based on determining that the user has registered for an event associated with the entity (e.g., an event about a company or created by a company administrator). The affinity networking system can also determine an affinity between a user and a co-user based on determining that the user has created a private digital clip note corresponding to the co-user.

As mentioned, in some embodiments, the affinity networking system can perform digital queries and provide digital responses (e.g., based on digital affinities between co-users or entities). For example, the affinity networking system can decrypt private digital clip notes and generate query responses based on the private digital clip notes. In addition to searching private digital clip notes, the affinity networking system can also generate query responses based on historical interactions identified through user profile information, event information, and/or entity information within the affinity networking system. To illustrate, in response to a query for a patent attorney, the affinity networking system can conduct a digital search through private digital clip notes (e.g., for previous notes regarding a patent attorney), previous digital events (e.g., for a patent attorney that attended the same event as a user), or profile information to generate a digital response (e.g. to identify patent attorneys that share previous interactions and context with a user of the query device). For example, the affinity networking system can generate and provide a query response by identifying private digital clip notes that match the query and by providing digital co-user cards, digital event cards, and/or digital entity cards linked with the private digital clip notes for display on the client device.

Indeed, in some embodiments, the affinity networking system can perform intra-entity queries and provide intra-entity search results. For example, the affinity networking system can search clip notes and/or user profiles within a particular entity (e.g., business, government organization, or non-profit) to return digital co-user cards that reflect a particular query. In this manner, the affinity networking system can allow entity client devices to identify affinities, matches, or support from among other co-users within the entity.

In one or more embodiments, the affinity networking system generates and provides targeted digital content to client devices based on one or more affinities. For example, the affinity networking system can provide targeted digital content within an event summary interface or an event member interface (or a different interface of the affinity networking system application). To target the digital content to provide to the client device, the affinity networking system can utilize one or more affinities associated with the user (e.g., to provide targeted digital content relating to a particular company for which the user has an affinity). Thus, based on the affinities of different users, the affinity networking system can provide different targeted digital content to different client devices.

The affinity networking system can provide additional functionality as well. For instance, the affinity networking system can conduct event administrator polling via client devices for feedback on an event. The affinity networking system can also facilitate communications individually or in groups via messaging interfaces on client devices. Further, the affinity networking system can facilitate digital content sharing between users and can provide interactive maps to help users navigate to particular events (e.g., by pre-populating or indicating an event location within a map).

The affinity networking system can provide several advantages over conventional social networking systems. For example, the affinity networking system can improve flexibility relative to conventional systems by generating custom private digital clip notes in relation to co-users as well as events or other entities within the affinity networking system. Moreover, the affinity networking system can generate user interfaces with co-user cards and corresponding clip note elements for tracking, monitoring, and storing private digital clip notes and interactions across time. Thus, the affinity networking system can flexibly determine and share digital context with regard to co-users and digital content that conventional systems lacked the flexibility to provide.

Additionally, while conventional systems provide uniform access only to available profile information, the affinity networking system flexibly adapts search results for each individual user. Indeed, the affinity networking system can provide customized query responses to individual users based on private digital clip notes created by each user and maintained by the affinity networking system for each user. Further, due to the rigid nature of the data available within some conventional systems, users often resort to trying to maintain collections of physical business cards to keep track of acquaintances from various work-related events. The affinity networking system, on the other hand, can generate and maintain (e.g., for access via the same client device or a different client device) private, context-aware digital clip notes of the user that are specific to individual co-users, events, or other entities.

Beyond improvements in flexibility and security, the affinity networking system can also improve efficiency in comparison to conventional systems. As an example of its improved efficiency, the affinity networking system requires fewer user interactions to access desired data and functionality. To elaborate, the affinity networking system provides an event member interface and an event summary interface that include interactive elements in an efficient, centralized location. For example, the event summary interface can include a clip note element for generating private digital clip notes and a registration element for registering for an event, both displayed simultaneously. In addition, the affinity networking system can provide digital event creation and/or registration elements together with co-user cards, digital communication elements, clip note elements, and search query elements within a single application, reducing the number of user interactions and applications used by client devices. By requiring fewer user interactions (and applications), the affinity networking system also requires fewer computer resources such as processing power and memory when compared to conventional systems that have to process large numbers of user interactions, and that also have to use additional resources for generating and displaying the various interfaces navigated by a user as a result of the interactions.

In addition, the affinity networking system can also improve security relative to conventional social networking systems. For example, as mentioned above, the affinity networking system can implement an asymmetric encryption approach that utilizes both a public key and a private key utilized by separate servers/systems for managing private digital clip notes created by users, which results in improved data security over conventional systems. Indeed, whereas conventional systems often store data on a server for direct access via a search, the affinity networking system encrypts and stores private digital clip notes using a public key on a first server and decrypts and searches encrypted notes (e.g., in response to a query) using a private key on an entirely separate, second server. Thus, only the user or client devices that can be authenticated with both keys can access the private digital clip notes created by the user. Additionally, in some embodiments, the affinity networking system decrypts and search private digital clip notes only in memory and thus never stores decrypted private digital clip notes on any database, thereby preventing access to decrypted private digital clip notes except during a single user doing a search.

Moreover, as mentioned above, the affinity networking system can also use an end-to-end symmetric encryption approach to secure private digital clip notes or other sensitive information in performing a search. For example, the affinity networking system can utilize a key stored in-app at a client device to encrypt private digital clip notes. The affinity networking system can then store the encrypted private digital clip notes and provide the private digital clip notes to the client device for search. The client device can utilize the in-app key to decrypt, search, and utilize the private digital clip notes, without exposing the private information to remote servers.

As another example of improved efficiency, the affinity networking system can utilize a distributed processing architecture for managing private digital clip notes while still maintaining security. In particular, the affinity networking system can apply multiple worker nodes simultaneously, or in parallel, to handle a query. Indeed, encryption can disrupt the ability to efficiently search digital data. The affinity networking system can circumvent this technical hurdle by focusing encryption/decryption on private data (e.g., private digital clip notes) and utilizing a distributed computing approach for decryption and search. For example, the affinity networking system can receive a query from a client device and utilize the public key to access only those private digital clip notes that belong to the user. In addition, the affinity networking system can transmit encrypted private digital clip notes to a second server storing the private key and parallelly utilize worker nodes to decrypt and search through batches of private digital clip notes.

As illustrated by the foregoing discussion, the present disclosure utilizes a variety of terms to describe features and benefits of the affinity networking system. Additional detail is hereafter provided regarding the meaning of these terms as used in this disclosure. In particular, the term "digital event" (or simply "event") refers to a scheduled incident or gathering and/or a digital representation of a scheduled incident or gathering (e.g., a digital representation of an event). For example, a digital event can include a computerized data structure defining a gathering of individuals (in person or virtually). A digital event within the affinity networking system can include stored data defining various aspects of the event such as a location, a start time, a venue, a topic or subject, a price to attend the event, a registration deadline, and an event organizer/administrator identification. Example events include seminars, classes, conventions, or meetings, some or all of which may be for physical attendance and/or virtual computer-based attendance.

As mentioned above, the affinity networking system can register users for an event based on user interaction with a registration element displayed within a digital event card of an event summary interface. As used herein, the term "digital event card" refers to a digital user interface object that includes summary information for a particular event.

For example, a digital event card can include digital information regarding an event and a selectable element to navigate to an event interface for the event. A digital event card can include various interactive elements such as a registration element and a clip note element displayed together within a single digital event card.

In addition, the term "registration element" refers to an interactive user interface element that is selectable to register for an event. In some embodiments, the registration element is selectable for one-click registration (e.g., where a user is automatically registered for an event based on a single selection of the registration element and where the affinity networking system performs the other tasks for registration such as processing payment and providing user profile information to the event administrator without additional user input). In other embodiments, the registration element is selectable to provide a registration interface whereby a user can enter information to register for an event.

Further, the term "clip note element" refers to an interactive user interface element that is selectable to generate a private digital clip note. In particular, a clip note element can include a selectable user interface element to provide a clip note interface whereby a user can input information to include within a private digital clip note. Such information can include custom user-generated tags as well as freeform text input. Indeed, a "clip note interface" refers to a user interface for creating or generating a private digital clip note. A clip note interface can include multiple fields such as a tag generation field for generating tags to associate with a co-user or an event and a text field for entering freeform text to include within a private digital clip note.

Relatedly, the term "private digital clip note" (or simply "clip note") refers to a digital item or object privately maintained for a user and/or client device. In particular, a private digital clip note can include a digital data object linked to a co-user, entity, and/or event and only accessible to individual user creators and corresponding client devices. As discussed in greater detail below, a private digital clip note can include a digital object that is linked to, references, or associated with a co-user, an event, or another entity registered within the affinity networking system. A private digital clip note can include tags, text, images, videos, and/or audio, that a user generates or adds to the private digital clip note. In addition, in some embodiments, a private digital clip note is searchable only by the user who creates the private digital clip note.

As mentioned, the affinity networking system can provide an event member interface that includes digital co-user cards for display on a client device. As used herein, the term "digital co-user card" refers to a digital user interface object that includes profile information for a particular co-user. For instance, a digital co-user card can include an interface element that displays profile information regarding a co-user and that is selectable to navigate to a co-user interface for accessing additional information about, and/or communicating with, the co-user. A digital co-user card can also include various interactive elements within it such as a clip note element for generating a private digital clip note relative to the co-user.

Relatedly, the term "digital entity card" refers to a digital user interface object that includes information for a particular entity. In particular, a digital entity card includes information for a company, an organization, a group, or a charity. In addition, a digital entity card is selectable to navigate to an entity interface for accessing additional information about, and/or communicating with, the entity. A digital entity card can also include various interactive elements such as a clip note element for generating a private digital clip note relative to the entity.

Relating to private digital clip notes, the affinity networking system can encrypt and decrypt private digital clip notes using user-specific keys. As used herein, the term "key" (e.g., a public key or a private key) refers to a digital key (e.g., a cryptographic key) for performing one or more security measures (e.g., encrypting and/or decrypting private digital clip notes). In one or more embodiments, a "public key" is accessible from a first database and maintained by a first server. In some embodiments, the public key is a string of bits, random or otherwise, that the affinity networking system utilizes to encrypt and/or access a private digital clip note from the first database.

In addition, the term "private key" refers to a digital key (e.g., a cryptographic key) mathematically related to a public key for performing one or more security measures (e.g., decrypting private digital clip notes). In some embodiments, the private key is accessible from a second database maintained by a second server apart from the first server. The private key can be a string of bits, random or otherwise, that the affinity networking system utilizes to decrypt encrypted private digital clip notes. In one or more embodiments, the affinity networking system generates both the public key and the private key for a user upon registration of the user with the affinity networking system. For example, the public key and/or the private key can be based on a user identification or other profile information specific to the user.

As mentioned, the affinity networking system can identify a query from a client device and can generate a query response for the query. As used herein, the term "query" refers to a request for digital information. In some embodiments, a request to perform a search based on a string of digital characters or another digital item (e.g., a search for a text string, tag, image, etc.). For example, a query can prompt the affinity networking system to search through private digital clip notes, co-user profile information, event information, and entity information to generate a query response. Relatedly, the term "query response" refers to a reply to a query. For instance, a query response can include a text string, one or more digital co-users cards, digital event cards, or digital entity cards that the affinity networking system identifies and provides in response to a query. In some embodiments, the affinity networking system displays a query response within a query response interface that is presented based on receiving a query.

Additional detail regarding the affinity networking system will now be provided with reference to the figures. For example, FIG. 1 illustrates a schematic diagram of an example system environment for implementing an affinity networking system 102 in accordance with one or more embodiments. An overview of the affinity networking system 102 is described in relation to FIG. 1. Thereafter, a more detailed description of the components and processes of the affinity networking system 102 is provided in relation to the subsequent figures.

As shown, the environment includes server(s) 104, an event administrator device 106, an entity administrator device 108, client device(s) 110, and a network 112. Each of the components of the environment can communicate via the network 112, and the network 112 may be any suitable network over which computing devices can communicate. Example networks are discussed in more detail below in relation to FIG. 9.

As mentioned, the environment includes one or more client device(s) 110. The client device(s) 110 can be one of a variety of computing devices, including a smartphone, a tablet, a smart television, a desktop computer, a laptop computer, a virtual reality device, an augmented reality device, or another computing device as described in relation to FIG. 9. In some embodiments, the environment can include multiple different client devices, each associated with a different user. The client device(s) 110 can communicate with the server(s) 104 via the network 112. For example, the client device(s) 110 can receive user input from a user interacting with the client device(s) 110 (e.g., via a client application 111 associated with the affinity networking system 102) to, for example, select a clip note element, select a registration element, or provide a query. Thus, the affinity networking system 102 on the server(s) 104 can receive information or instructions to generate a private digital clip note, register the user for an event, or generate a query response based on the input received by the client device(s) 110. The client device(s) 110 can include devices associated with employees of an entity, volunteers associated with an entity, or members associated with an entity.

As shown, the client device(s) 110 includes a client application 111. In particular, the client application 111 may be a web application, a native application installed on the client device(s) 110 (e.g., a mobile application, a desktop application, etc.), or a cloud-based application where all or part of the functionality is performed by the server(s) 104. The client application 111 can present or display information to a user, including various user interfaces such as an event summary interface and an event member interface. Additionally, the client application 111 can present information in the form of a query response based on receiving a query from the client device(s) 110. A user can interact with the client application 111 to provide user input to perform an operation as mentioned above.

As illustrated in FIG. 1, the environment includes the server(s) 104. The server(s) 104 may generate, track, store, process, receive, and transmit electronic data, such as user profile information, entity information, event information, private digital clip notes, affinities, queries and query responses. For example, the server(s) 104 may receive data from the client device(s) 110 in the form of information for a private digital clip note or a query. In addition, the server(s) 104 can generate a private digital clip note and can transmit data to the client device(s) 110 to provide a query response. Indeed, the server(s) 104 can communicate with the client device(s) 110 to transmit and/or receive data via the network 112. In some embodiments, the server(s) 104 comprises a distributed server where the server(s) 104 includes a number of server devices distributed across the network 112 and located in different physical locations. The server(s) 104 can comprise a digital content server, an application server, a communication server, a web-hosting server, or a machine learning server.

As shown in FIG. 1, the affinity networking system 102 includes a public key server 114 and a private key server 116. In particular, the affinity networking system 102 utilizes the public key server 114 to store public keys associated with users within the database 118. In some embodiments, the affinity networking system 102 utilizes the public key server 114 to use the public key to encrypt and store private digital clip notes within the database 118. In addition, the affinity networking system 102 utilizes the private key server 116 to store private keys within the database 120. For example, the affinity networking system 102 receives a system registration from the client device(s) 110 and generates a public key to store within the database 118 and a private key to store within the database 120. In some embodiments, the affinity networking system 102 utilizes the private key server 116 to use the private key to decrypt encrypted private digital clip notes and generate a query response. In these or other embodiments, the private key server 116 is remote from the public key server 114 and/or the server(s) 104 and communicates with the affinity networking system 102 via the network 112.

As illustrated, the environment also includes an event administrator device 106. In particular, the event administrator device 106 can be one of a variety of computing devices, including a smartphone, a tablet, a smart television, a desktop computer, a laptop computer, a virtual reality device, an augmented reality device, or another computing device as described in relation to FIG. 9. The event administrator device 106 can be associated with one or more events and can communicate with the affinity networking system 102 to generate and register events for users to attend. The event administrator device 106 can receive input from an event administrator to create and register an event within the affinity networking system 102 and can provide corresponding information to the affinity networking system 102. The affinity networking system 102 can thus generate an event and provide event information to the client device(s) 110, while also managing registration of the event based on user interaction from the client device(s) 110.

In some embodiments, the event administrator device 106 can perform other event-related tasks. For example, the event administrator device 106 can monitor event registrations, receive and provide digital communications with interested users and/or event members, broadcast an event on social media, follow up on user payment for event registration, create status badges for event members, and/or create a digital survey for event feedback. While FIG. 1 illustrates a single event administrator device 106, in some embodiments, the environment includes multiple event administrator devices each associated with a different event administrator.

As further illustrated in FIG. 1, the environment includes an entity administrator device 108. In particular, the entity administrator device 108 can be one of a variety of computing devices, including a smartphone, a tablet, a smart television, a desktop computer, a laptop computer, a virtual reality device, an augmented reality device, or another computing device as described in relation to FIG. 9. The entity administrator device 108 can be associated with an entity registered with the affinity networking system 102 such as a company or an organization. The entity administrator device 108 can receive input from an entity administrator to register with the affinity networking system 102 and can provide entity information such as an entity name, a size of the entity, a location of the entity, a field of work associated with the entity, or any events associated with the entity.

The entity administrator device 108 can perform additional functionality. In some embodiments, an entity administrator device 108 can also act as an event administrator device 106 to generate events related to the entity. For example, the entity administrator device 108 can promote events associated with the entity, distribute digital surveys to members of associated events, delegate event management to particular event administrator accounts (e.g., event management staff associated with the entity), and create a social media footprint for particular events. While FIG. 1 illustrates a single entity administrator device 108, in some embodiments, the environment includes multiple entity administrator devices each associated with a different entity administrator.

In some embodiments, the entity administrator device 108 includes an entity administrator application 109. In particular, the entity administrator application 109 can perform various functions described herein utilizing the entity administrator application. In addition, the entity administrator application 109 can provide an entity administrator to ability to generate and manage an entity profile. Further, the entity administrator application 109 can include functionality for creating entity-specific events and inviting users to attend the events. Additionally, the entity administrator application 109 can enable an entity administrator to, through various user interfaces, manage employee (i.e., user) profiles and approve or reject requests from employees (or other affiliated users) to attend events. Indeed, the entity administrator application 109 can include various elements and interfaces for managing the users, events, profile information, requests, reservations, communications, and other information associated with an entity.

As mentioned above, the affinity networking system 102 can also identify affinities and perform digital search queries within a particular entity. Thus, the entity administrator device 108 (or individual client devices corresponding to entity members), can identify other co-users/client devices corresponding to an entity based on particular affinities or searches. For example, when an internal opening for a position arises within an entity, the entity administrator device 108 (or an individual client device within the entity), can conduct a query search for co-users that satisfy position criteria based on affinities, events, profiles, private digital clip notes, or historical interactions maintained by the affinity networking system 102.

In communicating with and connecting the event administrator device 106, the entity administrator device 108, and the client device(s) 110, the affinity networking system 102 can determine various affinities between users, events, and entities. Particularly, the affinity networking system 102 monitors online interactions between different users, between users and entities, between users and events, and between entities and events. For example, the affinity networking system 102 monitors interactions such as clicks, messages, time spent within particular account pages, event registrations, event attendance, and queries. Indeed, in at least one embodiment the affinity networking system 102 is an event-based affinity networking system. Based on identifying a registration from the client device(s) 110 for a particular event, for example, the affinity networking system 102 determines an affinity between the user associated with the client device(s) 110 and the event (as well as the entity associated with the event and/or co-users attending the event).

In addition, the affinity networking system 102 determines affinities for users based on private digital clip notes. For example, the affinity networking system 102 receives input from the client device(s) 110 to generate a private digital clip note in relation to a particular co-user or event. Based on generating a private digital clip note for a user in relation to a co-user, the affinity networking system 102 determines an affinity between the user and the co-user. Similarly, based on generating a private digital clip note for a user in relation to an event, the affinity networking system 102 determines an affinity between the user and the event.

As used herein, the term "affinity" may represent the strength of a relationship or level of interest between particular objects associated with the affinity networking system 102, such as users, events, entities, digital content, actions, and other objects. As examples, actions may include sending messages, posting content, commenting on content, accessing or viewing profile pages or digital content, being registered for the same event, checking in at the same event, or attending the same event. An affinity may change based on continued monitoring of interactions or relationships. In some embodiments, the affinity networking system 102 may measure or quantify affinity. Thus, an affinity may represent or quantify the strength of a relationship between particular objects (e.g., strength of edges between two nodes in a knowledge graph). The affinity may also represent a probability that a user will perform a particular action based on the user's interest in the action. Affinities may thus be used to predict actions.

In particular embodiments, the affinity networking system 102 weights different factors differently when calculating an affinity. The weights for each factor may be static or the weights may change according to, for example, the user, the type of relationship, the type of action, and the user's location. In some embodiments, the affinity networking system 102 may consider a variety of variables when determining weights for various factors used to calculate an affinity, such as, for example, the time since information was accessed, decay factors, frequency of access, relationship to information or relationship to the object about which information was accessed, relationship to entities connected to the object, or user feedback. In these or other embodiments, the affinity networking system 102 may determine affinities using machine-learning algorithms trained on historical actions and past user responses, or data farmed from users by exposing them to various options and measuring responses.

Although FIG. 1 depicts the affinity networking system 102 located on the server(s) 104, in some embodiments, the affinity networking system 102 may be implemented by (e.g., located entirely or in part) on one or more other components of the environment. For example, the affinity networking system 102 may be implemented by the client device(s) 110 and/or a third-party device.

In some embodiments, though not illustrated in FIG. 1, the environment may have a different arrangement of components and/or may have a different number or set of components altogether. For example, the client device(s) 110 may communicate directly with the affinity networking system 102, bypassing the network 112. In addition, the private key server 116 can be located external to the server(s) 104 (e.g., in communication via the network 112). Additionally, the public key server 114 can be part of the server(s) 104 or else located externally to the server(s) 104 (e.g., in communication via the network 112).

Figure 2:
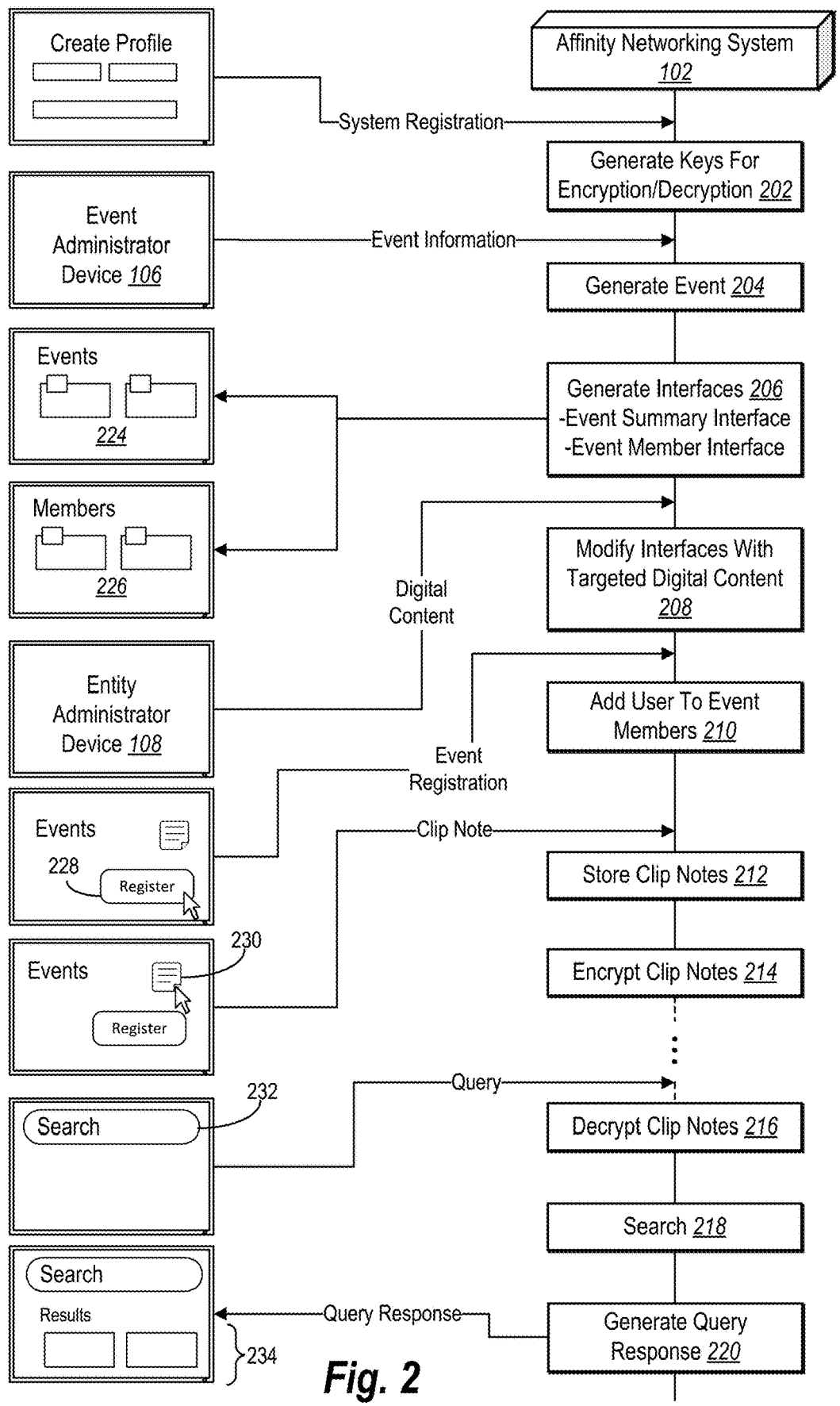
FIG. 2 illustrates an example flow diagram for generating a query response based on generating private digital clip note associated with events in accordance with one or more embodiments.

As mentioned, the affinity networking system 102 can generate and manage events with which users can interact within a common digital online space. In particular, the affinity networking system 102 can facilitate registrations for an event as well as interactions between users commonly registered for the event. FIG. 2 illustrates an overview of acts associated with the affinity networking system 102 as well as interactions with the client device(s) 110, the event administrator device 106, and the entity administrator device 108 in accordance with one or more embodiments.

As illustrated in FIG. 2, the affinity networking system 102 receives or identifies a system registration. Particularly, the affinity networking system 102 receives a registration of a user profile from the client device(s) 110 or receives a registration of an entity profile from the entity administrator device 108. For example, a user or an entity administrator provides profile information such as a name, a profile picture, and a description, and submits the information for registration as a new profile within the affinity networking system 102.

In some embodiments, the affinity networking system 102 enables different levels of user account registration. For instance, the affinity networking system 102 provides free user accounts that include targeted digital content, and further provides premium accounts for users who pay a fee (e.g., a one-time fee or a regular/monthly subscription fee) to remove the targeted digital content. In particular embodiments, the affinity networking system 102 charges a fee (e.g., a one-time fee or a regular/monthly subscription fee) to some entities (e.g., companies or other for-profit entities) for registering an account, while the affinity networking system 102 does not charge other entities (e.g., non-profit organizations or charities) for registering an account.

In response to receiving a system registration for a user from the client device(s) 110, the affinity networking system 102 performs an act 202 to generate user-specific keys for encryption and decryption. More specifically, the affinity networking system 102 generates a public key and a private key that are specific to the user and that are stored on separate databases. To make the keys specific to the user, the affinity networking system 102 generates the public key and the private key based on a user identification of the user or some other profile information unique to the user.

The affinity networking system 102 generates the public key to encrypt and access private digital clip notes created by the user. In particular, the affinity networking system 102 generates the public key for storage on a first database (e.g., the database 118) maintained by a first server (e.g., the public key server 114). Indeed, the affinity networking system 102 utilizes the public key server 114 to store the public key on the database 118.

Additionally, the affinity networking system 102 generates the private key to generate decrypted private digital clip notes. Particularly, the affinity networking system 102 generates the private clip note for decrypting encrypted private digital clip notes stored on the first database (e.g., the database 118). Indeed, the affinity networking system 102 stores the private key on a second database (e.g., the database 120) maintained by a second server (e.g., the private key server 116) that is separate or remote from the first server (e.g., the public key server 114).

In addition to generating public keys and private keys for users based on registration with the affinity networking system 102, the affinity networking system 102 further generates digital cards (e.g., digital co-user cards) to represent the registered users. Thus, depending on the interfaces displayed on the client device(s) 110, the affinity networking system 102 provides digital co-user cards for display to summarize co-user information for co-users who are, for example, registered for a common event with the user associated with the client device(s) 110.

As illustrated in FIG. 2, the affinity networking system 102 performs an act 204 to generate an event based on event information. In particular, the affinity networking system 102 receives event information from an event administrator device 106 to create an event within the affinity networking system 102. For example, the affinity networking system 102 receives event information such as an event name, a subject matter of the event, an event time, an event location (physical or virtual), an event description, an event price, and information for how to attend the event (e.g., login directions for virtual events). In some embodiments, the affinity networking system 102 enables only entity administrators to create events (i.e., to be an event administrator), while in other embodiments, the affinity networking system 102 enables user to create events.

Based on receiving the event information, the affinity networking system 102 performs the act 204 to generate an event. In particular, the affinity networking system 102 generates an event to maintain within a database and to manage for determining affinities, generating a digital event card, providing the digital event card to the client device(s) 110, and receiving registrations. Indeed, the affinity networking system 102 generates a digital event card for the event to summarize the information to provide to the client device(s) 110.

As illustrated, the affinity networking system 102 further performs an act 206 to generate interfaces. In particular, the affinity networking system 102 generates and provides an event summary interface 224 and an event member interface 226 for display on the client device(s) 110. Based on generating an event, for instance, the affinity networking system 102 generates an event summary interface 224 that includes a digital event card presenting information for the generated event. Indeed, the affinity networking system 102 provides the event summary interface 224 to the client device(s) 110 in response to user interaction selecting an event summary interface option to view events for which the user has an affinity.

In addition, the affinity networking system 102 generates the event member interface 226 to summarize users who are registered for the event. Based on receiving registrations for the event, for example, the affinity networking system 102 generates the event member interface 226 to include digital co-user cards for display on the client device(s) 110 to represent co-users who have registered for the event. As an example, in response to user interaction selecting a particular digital event card within the event summary interface 224, the affinity networking system 102 generates and/or provides the event member interface 226 to show the digital co-user cards of co-users registered for the event of the selected digital event card. Indeed, the affinity networking system 102 can generate event-specific event member interfaces based on which users are or are not registered for the particular events.

As further illustrated in FIG. 2, the affinity networking system 102 performs an act 208 to modify one or more interfaces (e.g., the event summary interface, the event member interface, or some other interface) with targeted digital content. More particularly, the affinity networking system 102 modifies user interfaces to include digital content that is targeted to the user. For instance, the affinity networking system 102 targets digital content received from the entity administrator device 108 (or from a different entity administrator device) based on affinities associated with the user to whom the user interface is being provided.

As an example, the affinity networking system 102 provides targeted digital content related to a particular event (or a similar event) for which the user is registered or for a particular entity associated with an event for which the user is registered. In at least one embodiment, the affinity networking system 102 generates and provides targeted digital content (e.g., relating to entities or events or other related products) to the client device(s) 110 based on determining that the user interacts with a clip note element for a co-user who is registered for a particular event. In some embodiments, the affinity networking system 102 identifies those users with free user accounts and modifies the user interfaces only of those users to include targeted digital content.

Thus, in these embodiments, the affinity networking system 102 refrains from modifying user interfaces of users with paying user accounts.

Additionally, the affinity networking system 102 performs an act 210 to add a user to a group of event members for an event. For instance, the affinity networking system 102 adds a user to a number of event members (e.g., a group of users who are registered for the event) based on receiving an event registration from the client device(s) 110. As shown, the affinity networking system 102 receives an event registration from the client device(s) 110 to register the user for the event. More specifically, the affinity networking system 102 identifies a user interaction with a registration element 228 to register the user for the event.

In some embodiments, the affinity networking system 102 performs a one-click registration for an event where, in response to a single user interaction (e.g., a single click or a single tap) of the registration element 228, the affinity networking system 102 registers the user for the event. To elaborate, the affinity networking system 102 identifies the single user interaction, and in response, the affinity networking system 102 automatically determines (e.g., auto-fills based on user preferences or privacy settings) user information and payment information, and further processes the payment for the event registration and adds the user to the event members. In other embodiments, the affinity networking system 102 provides an event registration interface for display on the client device(s) 110 in response to user interaction with the registration element 228. From the event registration interface, a user can provide event registration information such as user information and payment information.

As shown in FIG. 2, the affinity networking system 102 provides the registration element 228 within a digital event card displayed in the event summary interface 224. In some embodiments, the affinity networking system 102 provides the registration element 228 together with other user interface elements. For instance, the affinity networking system 102 provides the registration element 228 together with a clip note element 230 such that both elements are simultaneously displayed within a single digital event card of the event summary interface 224. By providing the elements together, the affinity networking system 102 reduces user interactions required to navigate between various interfaces to perform functions such as registering for an event or creating a private digital clip note.

Additionally, the affinity networking system 102 performs an act 212 to store one or more private digital clip notes for a user. To elaborate, the affinity networking system 102 identifies or receives user interaction in relation to the clip note element 230 (e.g., from within the event summary interface 224 or the event member interface 226). In response to the user interaction with the clip note element 230, the affinity networking system 102 further generates a private digital clip note for the user and stores the private digital clip note within a database (e.g., the database 118).

In some embodiments, the affinity networking system 102 provides a clip note interface for display on the client device(s) 110. Particularly, the affinity networking system 102 provides a clip note interface in response to user interaction with the clip note element 230. Within the clip note interface, a user enters information such as tags or freeform text to include as part of the private digital clip note. Thus, the affinity networking system 102 generates the private digital clip note to include the user-entered information. Additionally, the affinity networking system 102 stores the private digital clip note within a database (e.g., the database 118).

In one or more embodiments, the affinity networking system 102 performs an act 214 to encrypt private digital clip notes (or other digital content). Particularly, the affinity networking system 102 encrypts private digital clip notes created by a user utilizing a public key associated with the user. In some embodiments, the affinity networking system 102 encrypts the private digital clip notes before (or as part of the process of) storing the private digital clip notes on a database (e.g., the database 118). Thus, the affinity networking system 102 stores encrypted private digital clip notes within the database 118. Additionally, as indicated by the vertical ellipsis in FIG. 2, the affinity networking system 102 can repeatedly encrypt and store private digital clip notes as a user creates them over a length of time.

As further illustrated in FIG. 2, the affinity networking system 102 can provide private digital clip notes to client devices (e.g., at a later time after creating the private digital clip notes). As shown, the affinity networking system 102 provides a query element 232 (e.g., a search bar) within a user interface such as the event summary interface 224 or the event member interface 226. From the query element 232, the affinity networking system 102 receives a query to search through encrypted private digital clip notes created by the user and stored on the database 118.

For instance, the affinity networking system 102 identifies a query and performs an act 216 to decrypt encrypted private digital clip notes. Specifically, the affinity networking system 102 passes encrypted data such as private digital clip notes to a server (e.g., the private key server 116) associated with a private key of the user that is stored on the database 120 to utilize in decrypting the encrypted private digital clip notes. By thus utilizing the private key stored on a separate database (e.g., the database 120) that is apart from the database of the public key (e.g., the database 118), the affinity networking system 102 provides a secure way to store and retrieve private digital clip notes specific to individual users.

In addition, the affinity networking system 102 performs an act 218 to search through decrypted private digital clip notes based on the query. In some embodiments, the affinity networking system 102 performs the act 216 in parallel with the act 218. For example, the affinity networking system 102 identifies clusters of encrypted private digital clip notes within the database 118 and utilizes the private key to decrypt (act 216) and search (act 218) the private digital clip notes within the clusters. As a first cluster of private digital clip notes is decrypted and searched, the affinity networking system 102, in parallel with the decryption and search of the first cluster, searches and decrypts a second cluster of private digital clip notes to identify those that match the query. In some embodiments, the affinity networking system 102 utilizes a first processing thread of the private key server 116 to decrypt and search a first cluster of private digital clip notes while parallelly utilizing a second processing thread of the private key server 116 to decrypt and search a second cluster of private digital clip notes. Utilizing this parallel decryption-search technique, the affinity networking system 102 provides a fast, efficient search functionality and quickly generates a query response from user-specific private digital clip notes on the fly.

In some embodiments, the affinity networking system 102 performs the act 218 to search through other information in addition to private digital clip notes associated with a user. For example, the affinity networking system 102 searches through entity information (e.g., company-specific information) including an entity name, an entity size, a location of the entity, an entity description, and/or an area of business associated with the entity. In addition, the affinity networking system 102 searches through event information such as an event name, an event presenter, an event location, a maximum number of attendees, an event time, and an event subject matter. Further, the affinity networking system 102 searches through profile information associated with co-users of the affinity networking system 102 such as co-user names, co-user locations, co-user interests, co-user employment, and/or co-user job titles. The affinity networking system 102 performs these searches in accordance with applicable privacy regulations and profile privacy settings. Based on searching this information (in addition to private digital clip notes), the affinity networking system 102 generates a query response to provide for display on the client device(s) 110.

Indeed, the affinity networking system 102 further performs an act 220 to generate a query response 234. In particular, the affinity networking system 102 generates the query response 234 to provide for display within a query response interface. For example, the affinity networking system 102 generates the query response 234 by identifying digital co-user cards, digital event cards, and/or digital entity cards that correspond to a received query. In some embodiments, the affinity networking system 102 searches through private digital clip notes to identify private digital clip notes that correspond to the query, and further identifies digital co-user cards, digital event cards, or digital entity cards associated with the identified private digital clip notes to provide for the query response 234. Thus, the affinity networking system 102 enables a user to access private digital clip notes and/or recall previous acquaintances by searching through private digital clip notes to identify co-users for whom the user previously created a private digital clip note.

As an example of the flow illustrated and described in relation to FIG. 2, a user can register for and attend an event associated with the affinity networking system 102. The user can utilize the affinity networking system 102 to create a private digital clip note for a particular colleague who also attended the event. Specifically, the affinity networking system 102 generates a private digital clip note based on user interaction with a clip note element within a digital co-user card associated with the colleague and further based on input from the client device(s) 110 within a corresponding clip note interface. The affinity networking system 102 further encrypts and stores the private digital clip note for access by the user.

At a later point in time (e.g., days, weeks, or years later), the user forgets who the colleague was who attended the event with the user, and the user desires to recall some particular information about the colleague (e.g., the colleague's name or profession) or to reconnect with the colleague. Thus, the affinity networking system 102 receives a query from the client device(s) 110 including one or more terms for any anecdote the user may remember about the colleague. For example, the user remembers the event that he or she attended with the colleague and provides the event name as the query. In response to the query, the affinity networking system 102 identifies information relating to the query to provide as a query response.

Particularly, the affinity networking system 102 identifies a digital event card for the event, a digital entity card for the entity who put on the event, and digital co-user cards for co-users who attended the event. The affinity networking system 102 further decrypts and searches private digital clip notes to identify any private digital clip notes that correspond to the query. In some embodiments, the affinity networking system 102 prioritizes digital co-user cards for which the user created a private digital clip note higher in the query response. Thus, the affinity networking system 102 provides the digital co-user card for the colleague for display on the client device(s) 110, and the user can access the desired information about the colleague within the private digital clip note and/or within the digital co-user card of the colleague.

Figure 3A:
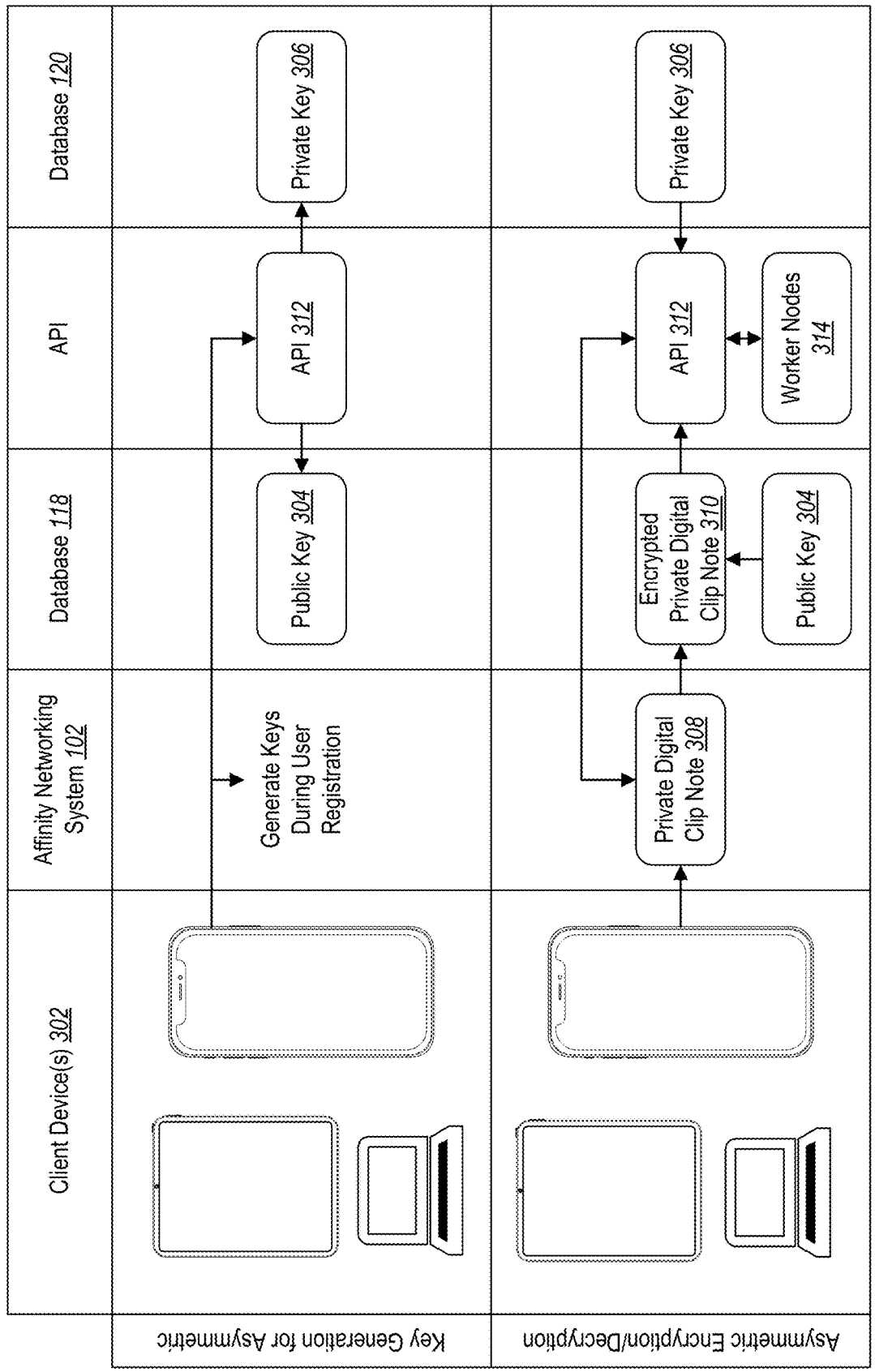
FIGS. 3A-3B illustrate encrypting and decrypting private digital clip notes in accordance with one or more embodiments.

As mentioned, the affinity networking system 102 can encrypt and decrypt private digital clip notes for individual users. In particular, the affinity networking system 102 can provide a secure way to manage and maintain private digital clip notes specific to individual users by utilizing a public key and a private key for each user. FIG. 3A illustrates an example flow for generating keys and applying the keys for asymmetric encryption and decryption (for secure messaging and/or for private digital clip notes) in accordance with one or more embodiments.

As illustrated in FIG. 3A, the affinity networking system 102 utilizes asymmetric encryption and decryption. In other words, the affinity networking system 102 utilizes pairs of keys—public keys and private keys—where one key (the public key) is used for encryption and the other key (the private key) is used to decrypt what the other encrypts. For example, the affinity networking system 102 generates a public key 304 and a private key 306 for a user associated with the client device(s) 302 (e.g., one of the client device(s) 110). By utilizing the public key 304 and the private key 306 and by storing the keys on separate databases (e.g., on separate servers), the affinity networking system 102 ensures a high level of security for private digital clip notes for users, even preventing system administrators from accessing private digital clip notes of a user.

Indeed, the affinity networking system 102 identifies user interaction with the client device(s) 302 to register the user with the affinity networking system 102. Based on registration with the affinity networking system 102, the affinity networking system 102 generates the public key 304 to store on the database 118 (e.g., a main database) and generates the private key 306 to store on the database 120 (e.g., a remote database).

In some embodiments, the affinity networking system 102 utilizes an application programming interface ("API") 312 to interact with the client device(s) 302. Particularly, the affinity networking system 102 utilizes various functions or methods of the API 312 to provide user interfaces for display on the client device(s) 302 and to receive user interactions from the client device(s) 302. Indeed, the API 312 can include a collection of methods and functions associated with the affinity networking system 102 stored locally and/or remotely and that are accessible to call or instantiate for performing particular tasks. By thus utilizing the API 312 for interacting with the client device(s) 302, the affinity networking system 102 detects user interaction to register with the affinity networking system 102 and further generates the user-specific public key 304 and private key 306 based on the system registration.

As further illustrated in FIG. 3A, the affinity networking system 102 receives a private digital clip note 308 from the client device(s) 302. In particular, the affinity networking system 102 receives a private digital clip note including text, tags, images, or other user-entered information associated with a co-user, an event, or an entity. In addition, the affinity networking system 102 utilizes the API 312 to encrypt the private digital clip note 308 utilizing the public key 304. More specifically, the affinity networking system 102 accesses the public key 304 stored on the database 118 and applies the public key 304 to encrypt the private digital clip note 308 for storage on the database 118.

To elaborate, in some embodiments, the affinity networking system 102 passes the private digital clip note 308 in plain text form to the database 118. The affinity networking system 102 further utilizes the public key 304 stored on the database 118 to encrypt the private digital clip note 308. Thus, the affinity networking system 102 generates the encrypted private digital clip note 310 for storage on the database 118.

As further illustrated in FIG. 3A, the affinity networking system 102 utilizes the API 312 to decrypt the encrypted private digital clip note 310. To decrypt the encrypted private digital clip note 310, the affinity networking system 102 provides encrypted data such as the encrypted private digital clip note 310 to a server (e.g., the private key server 116) associated with the private key 306 stored on the database 120 and applies the private key 306 to decrypt the encrypted private digital clip note 310. In one or more embodiments, the affinity networking system 102 utilizes worker nodes 314 in communication with the API 312 to perform the decryption.

Indeed, the affinity networking system 102 utilizes a distributed process for scaling the decryption across multiple worker nodes 314 for decrypting (and searching) encrypted private digital clip notes such as the encrypted private digital clip note 310. For instance, the affinity networking system 102 scales the decryption and the search based on queries from different client devices for different users. In some embodiments, the affinity networking system 102 assigns particular nodes of the worker nodes 314 to particular users (or groups of users) to handle decryption and search of private digital clip notes associated with those users (or groups of users). In the same or other embodiments, the affinity networking system 102 assigns particular nodes of the worker nodes 314 to particular tasks such as decrypting or searching.

For a particular query, for instance, the affinity networking system 102 identifies a first cluster of encrypted private digital clip notes utilizing a first set of worker nodes. The affinity networking system 102 further utilizes the first set of worker nodes to decrypt and search the first cluster. Additionally, the affinity networking system 102 utilizes a second set of worker nodes to decrypt and search through a second cluster of encrypted private digital clip notes to identify those that correspond to the query. Thus, for multiple clusters of encrypted private digital clip notes, the affinity networking system 102 parallelly decrypts and searches the clusters using different worker nodes (and/or processing threads) for the respective clusters. In one or more embodiments, the worker nodes 314 are maintained by the private key server 116 that also maintains the database 120.

In some embodiments, the affinity networking system 102 performs the decryption and the search within memory (e.g., in a stateless process) and without storing decrypted private digital clip notes on a database. Thus, the affinity networking system 102 does not provide or transmit any decrypted data back to a server or database associated with the public key (e.g., the database 118 or the public key server 114). Indeed, the affinity networking system 102 silos the encryption to the public key server 114 and the decryption and search of private digital clip notes to the private key server 116 to maintain isolation of the keys and the decrypted data. In other embodiments, the affinity networking system 102 stores decrypted private digital clip notes on a database such as the database 120. For example, the affinity networking system 102 decrypts the encrypted private digital clip note 310 and stores the decrypted private digital clip note on the database 120.

Figure 3B:
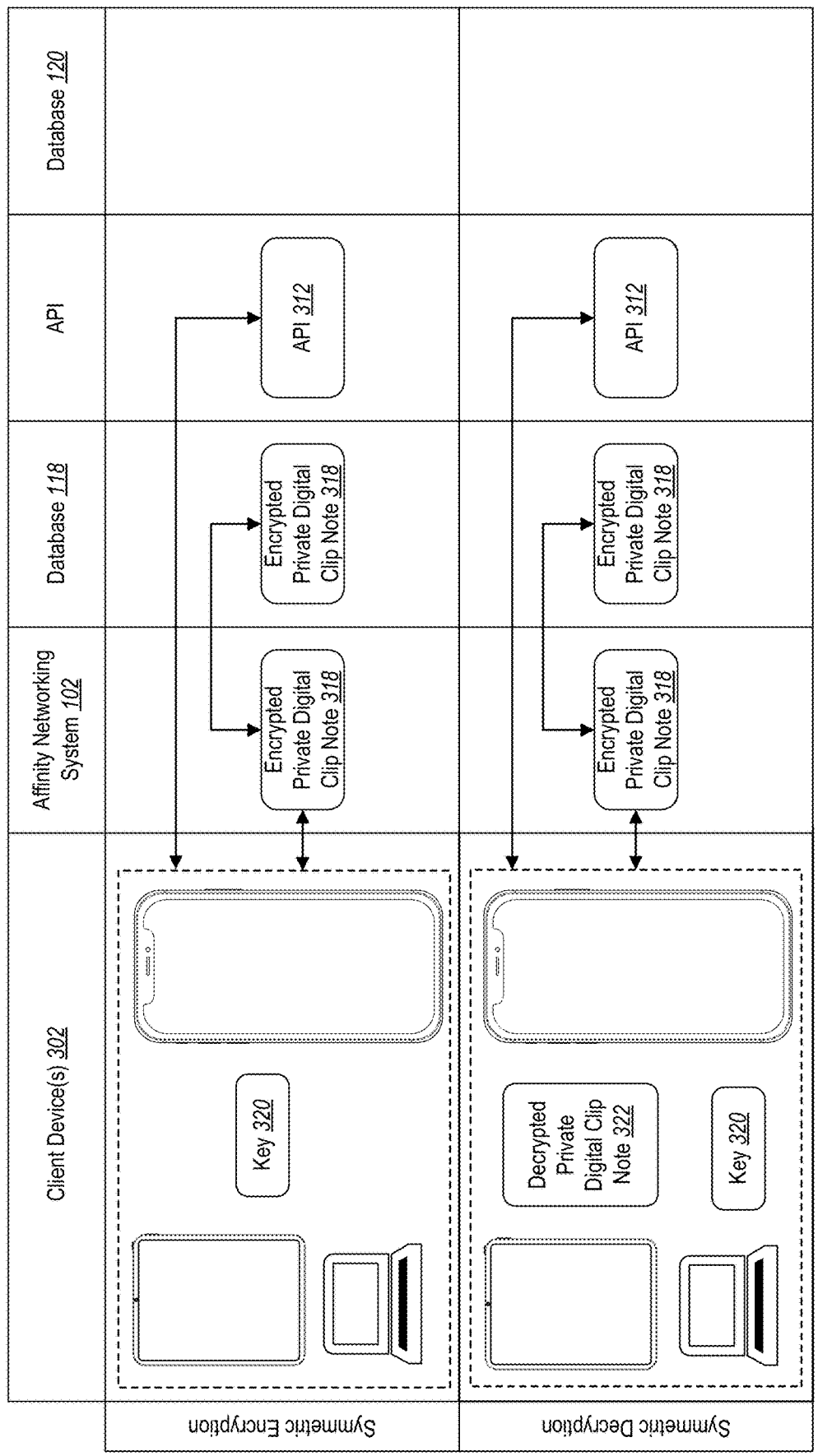

In addition (or alternatively) to the encryption and decryption described in relation to FIG. 3A, the affinity networking system 102 can implement a symmetric encryption and decryption approach. FIG. 3B illustrates symmetric encryption and decryption (for secure messaging and/or for private digital clip notes) in accordance with one or more embodiments. As shown, the affinity networking system 102 generates a key 320 for end-to-end encryption and decryption.

In some embodiments, the affinity networking system 102 utilizes the client device(s) 302 to generate the key 320 for encrypting and decrypting private digital clip notes (or digital communications). Indeed, the client device(s) 302 locally generates and stores the key 320 by way of the client application 111 (e.g., a browser) without ever transferring the key 320 externally to a database (e.g., the database 118 or the database 120). Thus, the only device that can access the key 320 for decrypting an encrypted private digital clip note (e.g., the encrypted private digital clip note 318) is the client device(s) 302 (or another client device that obtains the key 320 from the client device(s) 302).

To encrypt a private digital clip note, as shown in FIG. 3B, the client device(s) 302 interacts with the API 312 to access and implement particular encryption methods or processes. Particularly, the client device(s) 302 utilizes various functions or methods of the API 312 detect or identify user input within the client application 111 to, for example, register with the affinity networking system 102. Based on the registration, the client device(s) 302 further generates the key 320 from the username of the user or from some other unique information associated with the user, the client application 111, or the client device(s) 302.

Additionally, the client device(s) 302 utilizes methods and functions of the API 312 to generate the encrypted private digital clip note 318 utilizing the key 320. In addition, the client device(s) 302 provides the encrypted private digital clip note 318 to the affinity networking system 102 for storage on the database 118. In some embodiments, the affinity networking system 102 encrypts the private digital clip note at the device level or the browser/application level to prevent any decrypted data or the key 320 from ever leaving the client device(s) 302 or the client application 111.

In response to a query to search through private digital clip notes of the user, the client device(s) 302 further decrypts the encrypted private digital clip note 318 stored on the database 118. In particular, the client device(s) 302 can place a call to the API 312 for encrypted information. In response, the affinity networking system 102 can access the encrypted private digital clip note 318 from the database 118 and provide the encrypted private digital clip note 318 to the client device. The client device(s) 302 can identify the query and apply the key 320 (stored locally on the client device(s) 302) to decrypt the encrypted private digital clip note 318. Thus, in some embodiments, the client device(s) 302 generates the decrypted private digital clip note 322 from the encrypted private digital clip note 318 and maintains the decrypted private digital clip note 322 only locally (in memory) on the client device(s) 302 to prevent any third-party access. As a result, the affinity networking system 102 can utilize the client device(s) 302 to further search the decrypted private digital clip note based on the query.

In some embodiments, with the end-to-end encryption and decryption shown and described in relation to FIG. 3B, neither the key 320 nor any unencrypted data (e.g., the decrypted private digital clip note 322) ever leaves the client device(s) 302 (or the client application 111). This measure, in addition to utilizing the username of the user or some other device-specific or user-specific information to generate and access the key 320, prevents other users, entity administrators, event administrators, or even system administrators from accessing private digital clip notes of the user.

In one or more embodiments, the affinity networking system 102 enables the user to search private digital clip notes from a different device than the device through which the user registered with the affinity networking system 102. To authorize a different client device to access the key 320 for decrypting (and subsequently searching) private digital clip notes, the affinity networking system 102 utilizes a secure authorization technique. For example, the affinity networking system 102 can provide a QR code transferrable (e.g., scannable) from a first client device to a second client device to authorize the second client device to access the key 320 (or to provide the key 320 to the second client device). Indeed, the affinity networking system 102 provides (e.g., transfers) the key 320 from a first client device to a second client device by way of the QR code, whereupon the second client device can decrypt the encrypted private digital clip note 318. Although QR codes is an exemplary approach, the affinity networking system 102 can provide authorization (e.g., provide the key) to other client devices in a variety of ways, including Bluetooth, local area network transfer, or another secure transferring protocol.

Figure 4:
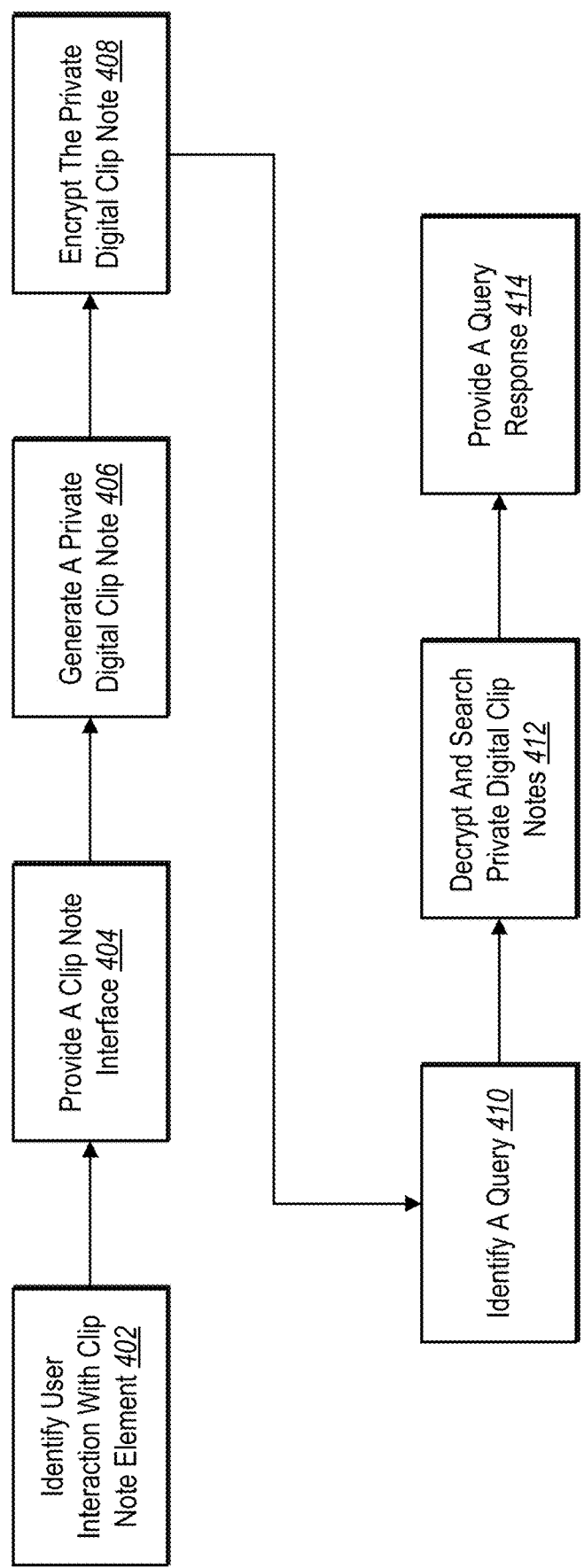
FIG. 4 illustrates an example series of acts for providing a query response based on a search of user-specific private digital clip notes in accordance with one or more embodiments.

As mentioned, the affinity networking system 102 can generate and provide a query response based on private digital clip notes created by a user. In particular, the affinity networking system 102 can search through private digital clip notes and other information (e.g., entity information, co-user profile information, and event information) to identify information that corresponds to a query. FIG. 4 illustrates an example flow of acts 402-414 for providing a query response based on searching one or more private digital clip notes created by a user in accordance with one or more embodiments.

As shown in FIG. 4, the affinity networking system 102 performs an act 402 to identify a user interaction with a clip note element. In particular, the affinity networking system 102 receives an indication of a selection of a clip note element (e.g., the clip note element 230) from within an interface such as an event summary interface (e.g., the event summary interface 224) or an event member interface (e.g., the event member interface 226).

In response to the user interaction with the clip note element 230, the affinity networking system 102 provides a clip note interface for display on the client device associated with the user (e.g., the client device(s) 302). Within the clip note interface, the affinity networking system 102 provides various input options such as a tag generation field for generating tags to include within the private digital clip note and a text field for generating text to include within the private digital clip note. Additional detail regarding the clip note interface is provided below with reference to FIG. 8B.

As further shown in FIG. 4, the affinity networking system 102 performs an act 406 to generate a private digital clip note. Particularly, the affinity networking system 102 receives input from the client device(s) 302 of various tags, text, images, or other information to include within the private digital clip note, and the affinity networking system 102 generates the private digital clip note to store within a database (e.g., the database 118).

As an example, the affinity networking system 102 generates a co-user private digital clip note based on a user creating the private digital clip note for a particular co-user (e.g., in response to a user interaction with a clip note element within a particular digital co-user card). As other examples, the affinity networking system 102 generates an event private digital clip note for a particular event (e.g., in response to a user interaction with a clip note element within a particular digital event card) or an entity private digital clip note (e.g., in response to a user interaction with a clip note element within a particular digital entity card). By generating private digital clip notes based on which clip note element is selected (e.g., which digital card is associated with the clip note element), the affinity networking system 102 thus generates context-based private digital clip notes that are associated with, linked to, or tied to a particular co-user, event, or entity.

In some embodiments, the affinity networking system 102 generates voice-based private digital clip notes. To elaborate, the affinity networking system 102 provides a voice recording element within the clip note interface that is selectable to record audio. Thus, the affinity networking system 102 receives recorded audio for a private digital clip note. In one or more embodiments, the affinity networking system 102 further transcribes the audio into text. In particular, the affinity networking system 102 can utilize a voice-to-text algorithm to convert audio to a text transcription. Thus, the affinity networking system 102 can generate a private digital clip note from recorded voice audio of a user.

Upon generating a private digital clip note, the affinity networking system 102 further performs an act 408 to encrypt the private digital clip note. In particular, the affinity networking system 102 utilizes a public key (e.g., the public key 304) stored on a first database (e.g., the database 118) to encrypt the private digital clip note. In some embodiments, the affinity networking system 102 encrypts the private digital clip note by converting the private digital clip note into a series of bits based on the public key 304. For instance, the affinity networking system 102 can perform any of a number of operations relative to the public key 304 to encrypt the private digital clip note such as adding bit values of the public key 304 to bit values of letters within the private digital clip note, subtracting bit values, or performing more complex algorithms with the values of the public key 304.

As further illustrated in FIG. 4, the affinity networking system 102 performs an act 410 to identify a query. Particularly, the affinity networking system 102 receives a query from the client device(s) 302 in the form of one or more query terms to use as a basis for performing a search. In some embodiments, the affinity networking system 102 identifies a query entered into a query element (e.g., the query element 232) such as a search bar with an interface such as the event summary interface 224 or the event member interface 226.

In at least one embodiment, the interface in which the query is entered affects the information that the affinity networking system 102 searches in response to the query. For example, if the affinity networking system 102 determines that the user interaction originated from a query element within an even summary interface, then the affinity networking system 102 searches only event information and private digital clip notes of the user associated with events. As another example, if the affinity networking system 102 determines that the user interaction originated from a query element within an event member interface, then the affinity networking system 102 searches only for user profile information and private digital clip notes related to co-users registered for the event. In other embodiments, the affinity networking system 102 searches all available information including private digital clip notes of the user, event information, co-user profile information, and entity information, regardless of which interface the user interacted with to initiate the search.

Indeed, as illustrated in FIG. 4, the affinity networking system 102 performs an act 412 to decrypt and search private digital clip notes. In particular, as part of a search that may include searching through additional information, the affinity networking system 102 parallelly decrypts and searches private digital clip notes created by the user while refraining from searching through private digital clip notes created by other users. By bifurcating the data stored within the database 118, for instance, the affinity networking system 102 ensures that only private digital clip notes created by the user are searchable by the user.

As mentioned, the affinity networking system 102 decrypts and searches some encrypted private digital clip notes in parallel with decrypting and searching other encrypted private digital clip notes. Indeed, the affinity networking system 102 provides a first set or cluster of encrypted private digital clip notes to the private key server 116 to utilize the private key 306 stored on the database 120 to decrypt the encrypted private digital clip notes in the cluster and search the decrypted private digital clip notes. In addition, the affinity networking system 102 also decrypts and searches private digital clip notes within a second set or cluster utilizing different worker nodes and/or processing threads of the private key server 116. In some embodiments, the affinity networking system 102 performs the act 412 to decrypt and search only within system memory, not only for quickly generating query responses on the fly, but also for increased security (by never storing decrypted private digital clip notes for later access).

In some embodiments, the affinity networking system 102 exports a private digital clip note (e.g., an encrypted or a decrypted private digital clip note) to a more universal format for use in other systems. Indeed, some entities or users may utilize different customer relationship management ("CRM") systems to manage, run, or disseminate information for particular events. For compatibility with other CRM systems, the affinity networking system 102 exports a private digital clip note (or multiple private digital clip notes) to a format usable in another CRM system so that a user attending an event associated with the other system can nevertheless access the information from the private digital clip note(s) within the other CRM system.

To elaborate, the affinity networking system 102 can export a private digital clip note (or other digital content) to a comma-separated value ("CSV") file. For instance, the affinity networking system 102 identifies or receives an indication to export a private digital clip note to a CSV file. In some embodiments, the affinity networking system 102 receives or detects a user interaction with an export element within a particular interface (e.g., a clip note interface). Thus, the affinity networking system 102 exports the private digital clip note associated with the clip note interface based on the user interaction.

As illustrated in FIG. 4, the affinity networking system 102 performs an act 414 to provide a query response. In particular, the affinity networking system 102 generates and provides a query response for display on the client device(s) 302 in response to receiving the query. In some embodiments, the affinity networking system 102 generates the query response by identifying digital co-user cards, digital event cards, and/or digital entity cards corresponding to (e.g., linked to, tied to, or associated with) private digital clip notes identified as part of the search. In these or other embodiments, the affinity networking system 102 generates the query response by identifying digital co-user cards, digital event cards, and/or digital entity cards that are otherwise identified as a result of searching through co-user profile information, event information, and entity information. In any event, the affinity networking system 102 provides a query response in the form of the identified digital co-user cards, digital event cards, and/or digital entity cards for display on the client device(s) 302.

In some embodiments, a query response (e.g., the query response 234) includes information other than (in addition to) digital co-user cards, digital event cards, and/or digital entity cards. For example, the affinity networking system 102 performs a search to identify websites, user profiles, products, or other information based on query. The affinity networking system 102 further provides a listing of the websites, user profiles, products, and other information as part of the query response along with the digital co-user cards, the digital event cards, and/or the digital entity cards.

In performing a search to generate a query response, the affinity networking system 102 identifies digital co-user cards, digital event cards, and/or digital entity cards as well as other digital information pertaining to a query. For example, the affinity networking system 102 matches terms used in a query to terms associated with co-users, events, and/or entities. Indeed, the affinity networking system 102 matches query terms with terms identified within a private digital clip note, an event description, an entity description, or a co-user profile to identify digital co-user cards, digital event cards, and/or digital entity cards to provide as a query response.

Other than matching terms, the affinity networking system 102 can further utilizes a knowledge graph for searching based on a query. For instance, the affinity networking system 102 utilizes a knowledge graph that consists of nodes and edges. Within the knowledge graph, nodes can correspond to or represent various objects (e.g., digital co-user cards, digital event cards, digital entity cards, websites, products, user profiles, events, entities, or other searchable information) and edges can define the relationships between the nodes (e.g., based on terms associated with the nodes, subject matter of the nodes, or concepts relating to the nodes). Thus, nodes with closer edges (or edges defining a higher degree of similarity) are more similar to each other than nodes with farther edges.

In response to a query, the affinity networking system 102 identifies one or more nodes that correspond to the query (e.g., that are associated with terms found within the query). To generate a query response, the affinity networking system 102 identifies nodes with edges within a threshold similarity of the corresponding node(s). The affinity networking system 102 thus provides information (e.g., digital co-user cards, digital event cards, digital entity cards, websites, products, user profiles, events, entities, or other searchable information) for the identified nodes as part of the query response. Thus, the affinity networking system 102 can generate a query response that includes nodes that do not necessarily include matching terms with the query but are nonetheless identified based on conceptual similarity/affinity.

As mentioned, the affinity networking system 102 can provide a client application (e.g., the client application 111) to one or more client devices (e.g., the client device(s) 110)

that provides various functionality to interact with co-users, events, and entities networked as part of the affinity networking system 102. In particular, the affinity networking system 102 can provide user interfaces for performing various actions from a mobile device, a desktop/laptop computing device, or some other type of device. Indeed, to provide a user interface (e.g., an event member interface or an event summary interface), the affinity networking system 102 provides information (e.g., data packets) to a client device (e.g., the client device(s) 110) to populate the user interface and/or user interface elements. FIGS. 5A-7B illustrate some of the interfaces on a mobile device (e.g., the client device(s) 302 utilizing a mobile version of the client application 111). Thereafter, FIGS. 7A-8E illustrate other interfaces and functionality on a different device (e.g., a personal computer accessing a web-based version of the client application 111). However, any of the illustrated interfaces and the corresponding descriptions are applicable to either mobile or non-mobile applications.

Figure 5B:
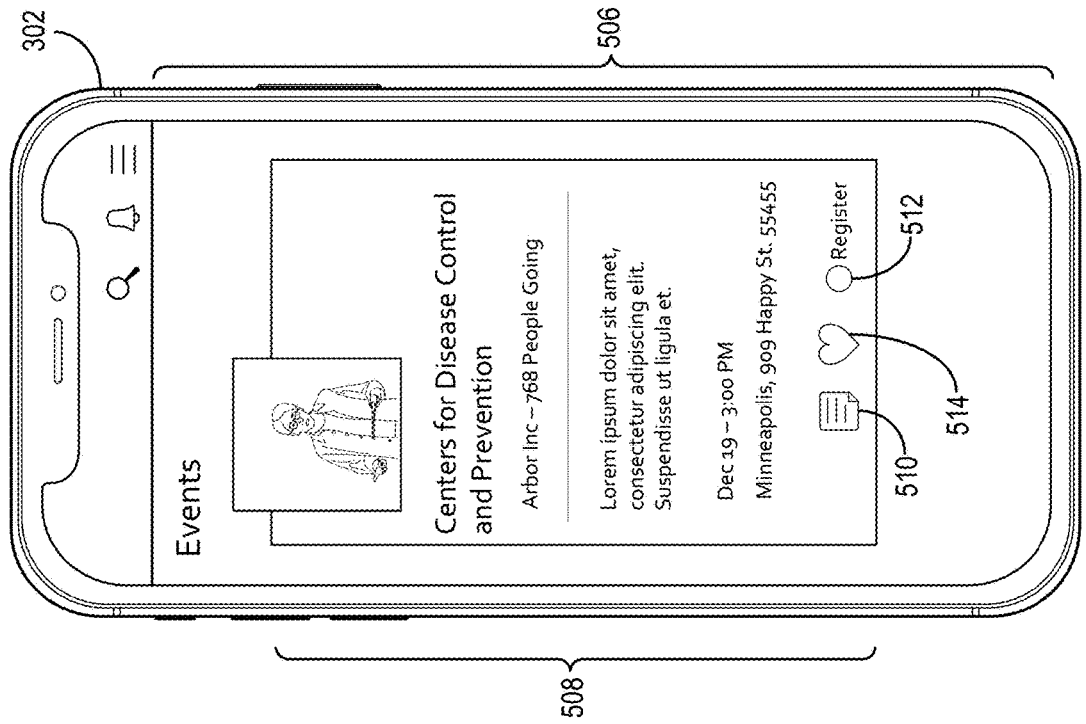
FIG. 5B illustrates an example event summary interface in accordance with one or more embodiments.
Figure 5A:
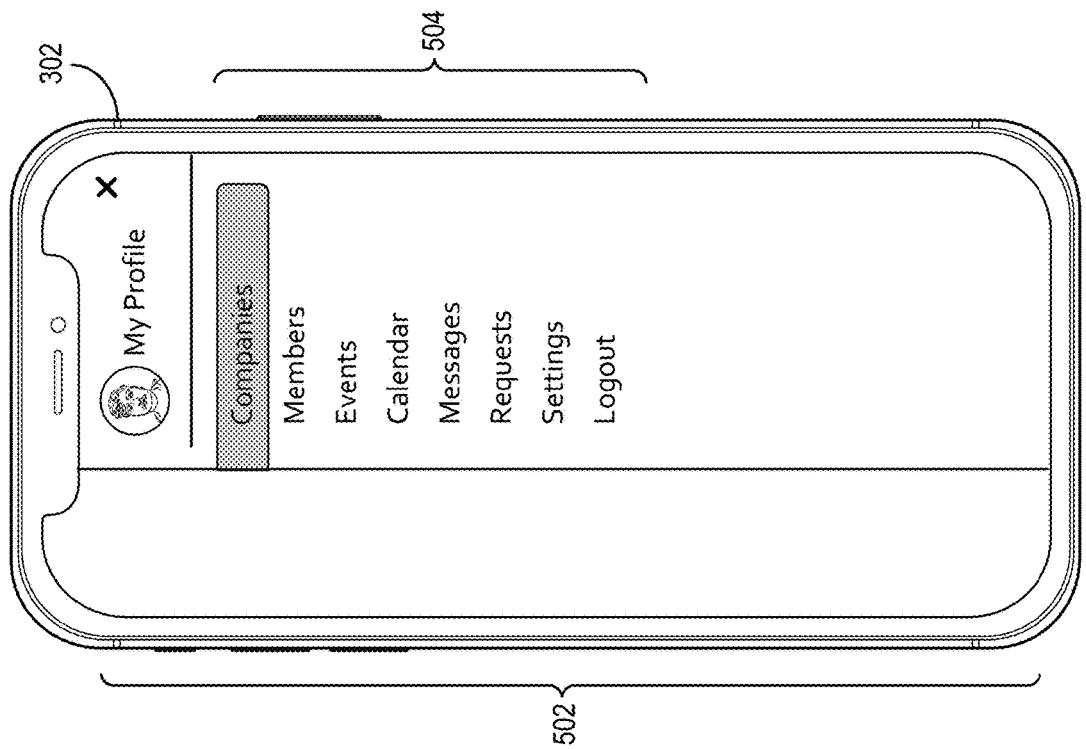
FIG. 5A illustrates an example navigation menu interface in accordance with one or more embodiments.

FIG. 5A illustrates an example navigation menu interface 502 of the client application 111 as displayed on the client device(s) 302 in accordance with one or more embodiments. As shown, the affinity networking system 102 provides the navigation menu interface 502 that includes a menu 504 of selectable options for navigating between different user interfaces. For example, in response to a selection of the "Companies" option, the affinity networking system 102 provides an entity summary interface to display digital entity cards for companies and other organizations.

As another example, in response to a selection of the "Members" option, the affinity networking system 102 provides an event member interface (e.g., the event member interface 226) for display on the client device(s) 302. In response to a selection of the "Events" option, the affinity networking system provides an event summary interface (e.g., the event summary interface 224) for display on the client device(s) 302. Likewise, the affinity networking system 102 provides corresponding user interfaces in response to selections of the other options as well. For instance, the affinity networking system 102 provides a calendar interface, a messages interface, a requests interface, a settings interface, or a logout interface.

Within the calendar interface, the affinity networking system 102 enables the user to interact with calendar items such as scheduled events for which the user is registered. Indeed, the affinity networking system 102 automatically (e.g., without additional user input) adds registered events to the calendar of the user. Thus, within the calendar interface, the affinity networking system 102 provides interactive calendar elements for the registered events in interface locations corresponding to the days/times when the events take place. Additionally, the affinity networking system 102 can create additional calendar items for meeting with co-users and/or for any other scheduled items.

As mentioned, the affinity networking system 102 also provides a messages interface in response to user interaction with the "Messages" option. Within the messages interface, the affinity networking system 102 enables a user to compose messages to communicate with co-users. In some embodiments, the affinity networking system 102 further enables users to communicate with event administrators and/or entity administrators to, for example, ask questions about an upcoming event. The affinity networking system 102 further provides interactive elements for messages received from co-users, event administrators, and/or entity administrators so that the user can read the received messages.

The affinity networking system 102 further provides a requests interface in response to user interaction with the "Requests" option. Within the requests interface, the affinity networking system 102 provides a display of received requests to connect with the user. For example, the affinity networking system 102 receives requests from a co-user, an event administrator, or an entity administrator to connect with the user (e.g., to be added to a contact list, an affiliated entities list, an interested events list, or a friends list associated with the user). Thus, the affinity networking system 102 enables the user to accept or decline such requests within the requests interface.

In some embodiments, the affinity networking system 102 enables a user (e.g., an employee of an entity) to request attendance for an event through the "Requests" option, whereupon the affinity networking system 102 provides the request to an entity administrator device to approve (and pay for) attendance of the event by the user. Indeed, in these embodiments, entity administrators or employee managers pay for and manage event attendance requests. Thus, upon receiving a request to attend an event from a user, the affinity networking system 102 provides the request to the administrator/manager for approval. If the administrator/manager approves the request, then the affinity networking system 102 adds the user to the event members.

Indeed, for an entity administrator or an employee manager account, the affinity networking system 102 provides a view of requests for event attendance received from various users. Thus, the affinity networking system 102 enables the administrator/manager to approve or deny event requests as well as submit payments for various requests from subordinate user accounts (e.g., employees, volunteers, or group members).

In addition, the affinity networking system 102 provides a "Reservations" option for the entity administrator or the employee manager to reserve attendance for (and pay for) an event. For example, the affinity networking system 102 determines that an administrator/manager need not request permission from a superior account to attend an event, and the affinity networking system 102 therefore provides a "Reservations" option for direct event registration. Upon detecting selection of the "Reservations" option, the affinity networking system 102 provides a user interface (e.g., a registration interface) to register for and pay for attending an event.

Additionally, the affinity networking system 102 provides a settings interface in response to user interaction with the "Settings" option. Within the settings interface, the affinity networking system 102 enables a user to modify various settings associated with the user account. For example, the affinity networking system 102 enables the user to change privacy settings, notification settings, and visibility settings (e.g., to set who can view user profile information and how much of the information is available to view). Indeed, based on user interaction with a notification settings option, the affinity networking system 102 can enable or disable push notifications or in-app notifications for various items such as upcoming events, received requests and received messages.

Furthermore, the affinity networking system 102 provides a "My Profile" option within the navigation menu interface 502. In response to user interaction with the "My Profile" option, the affinity networking system 102 provides a user profile interface. Within the user profile interface, the affinity networking system 102 provides various interface elements to change profile information. For instance, the affinity networking system 102 can to change a username, a profile picture, a description, interested entities, interested events, and connections with co-users, events, or entities.

As shown, the affinity networking system 102 further provides a "Logout" option. In response to user interaction with the "Logout" option, the affinity networking system 102 provides a logout interface for display on the client device(s) 302. Particularly, the affinity networking system 102 provides a logout interface that includes a selectable logout option to log out of the affinity networking system 102. In some embodiments, the affinity networking system 102 logs the user out based on a single selection of the "Logout" option (e.g., without any additional user input). In other embodiments, the affinity networking system 102 provides a logout interface that requests confirmation of the logout.

As mentioned, the affinity networking system 102 can provide an event summary interface (e.g., the event summary interface 224) for display on the client device(s) 302. In particular, the affinity networking system 102 can provide an event summary interface that includes digital event cards summarizing various events (e.g., for which a user has an affinity). FIG. 5B illustrates an event summary interface 506 including a digital event card 508 displayed on the client device(s) 302 in accordance with one or more embodiments.

As illustrated in FIG. 5B, the client device(s) 302 displays the event summary interface 506 (e.g., the event summary interface 224) including the digital event card 508. Within the digital event card 508, the client device(s) 302 displays information relating to a particular event. Particularly, the affinity networking system 102 determines that the user has an affinity for the event and therefore provides the digital event card 508 for the event called "Centers for Disease Control and Prevention" presented by "Arbor Inc." In some embodiments, the affinity networking system 102 provides the digital event card 508 irrespective of determining an affinity associated with the user but instead to promote a particular event. The digital event card 508 includes additional information, such as a number of users attending the event ("768 People Going"), a description of the event ("Lorem ipsum dolor . . . "), a time of the event ("December 19-3:00 PM"), and a location of the event ("Minneapolis, 909 Happy St. 55455"). In some embodiments, the digital event card 508 includes additional information such as a number of available slots for the event (e.g., "120 available seats" or "768 out of 1000 seats filled").

Additionally, the digital event card 508 includes interactive elements such as the clip note element 510, the registration element 512, and the affinity element 514. By displaying the clip note element 510 together with the registration element 512 (i.e., within the same digital event card 508 of the same event summary interface 506), the affinity networking system 102 provides an efficient user interface that enables the user to access functionality such as creating a private digital clip note and/or registering for an event by performing relatively few user interactions and from a centralized location.

In response to user interaction with the clip note element 510, the affinity networking system 102 generates a private digital clip note associated with the event of the digital event card 508. For example, the affinity networking system 102 provides a clip note interface whereby a user can enter information to include within a private digital clip note such as tags, text, images, audio, and/or video. Additional detail regarding generating a private digital clip note and providing a clip note interface is provided below with reference to subsequent figures.

In response to user interaction with the affinity element 514, the affinity networking system 102 generates or determines an affinity between the user and the event. In embodiments where the affinity networking system 102 has already determined an affinity between the user and the event (e.g., as motivation to surface the digital event card 508 to the client device(s) 302 in the first place), the affinity networking system 102 strengthens or increases the affinity based on user interaction with the affinity element 514. The affinity networking system 102 further determines affinities for similar events, entities associated with the event or similar events, and/or co-users registered for the event or similar events based on user interaction with the affinity element 514.

In response to user interaction with the registration element 512, the affinity networking system 102 registers the user for the event of the digital event card 508. As mentioned above, in some embodiments the affinity networking system 102 performs a one-click registration based on a single user interaction with the registration element 512. To elaborate, for a user who has enabled one-click registration (e.g., within the settings interface), the affinity networking system 102 identifies, detects, or receives the user interaction with the registration element 512 and then performs a number of acts in response to register the user for the event. Particularly, the affinity networking system 102 automatically determines payment information for the user (e.g., from stored payment information entered via the settings interface), adds a single registration for the user to the event members of the event, and processes payment utilizing a merchant card processing API or some other secured payment gateway.

In other embodiments, the affinity networking system 102 provides a registration interface whereby the user provides information and/or payment to register for the event. For example, the affinity networking system 102 provides a registration interface that includes various interactive elements for adding a number of registrations, adding payment information (e.g., a credit card number and/or a coupon code), and confirming payment. Additional detail regarding the registration interface is provided below with reference to FIG. 5D.

While FIG. 5B illustrates a single digital event card 508, the event summary interface 506 is scrollable. For instance, in response to user interaction to scroll (e.g., via a swipe gesture) through the event summary interface 506, the client device(s) 302 presents additional digital event cards associated with events for which the user has an affinity.

Figures 5C, 5D:
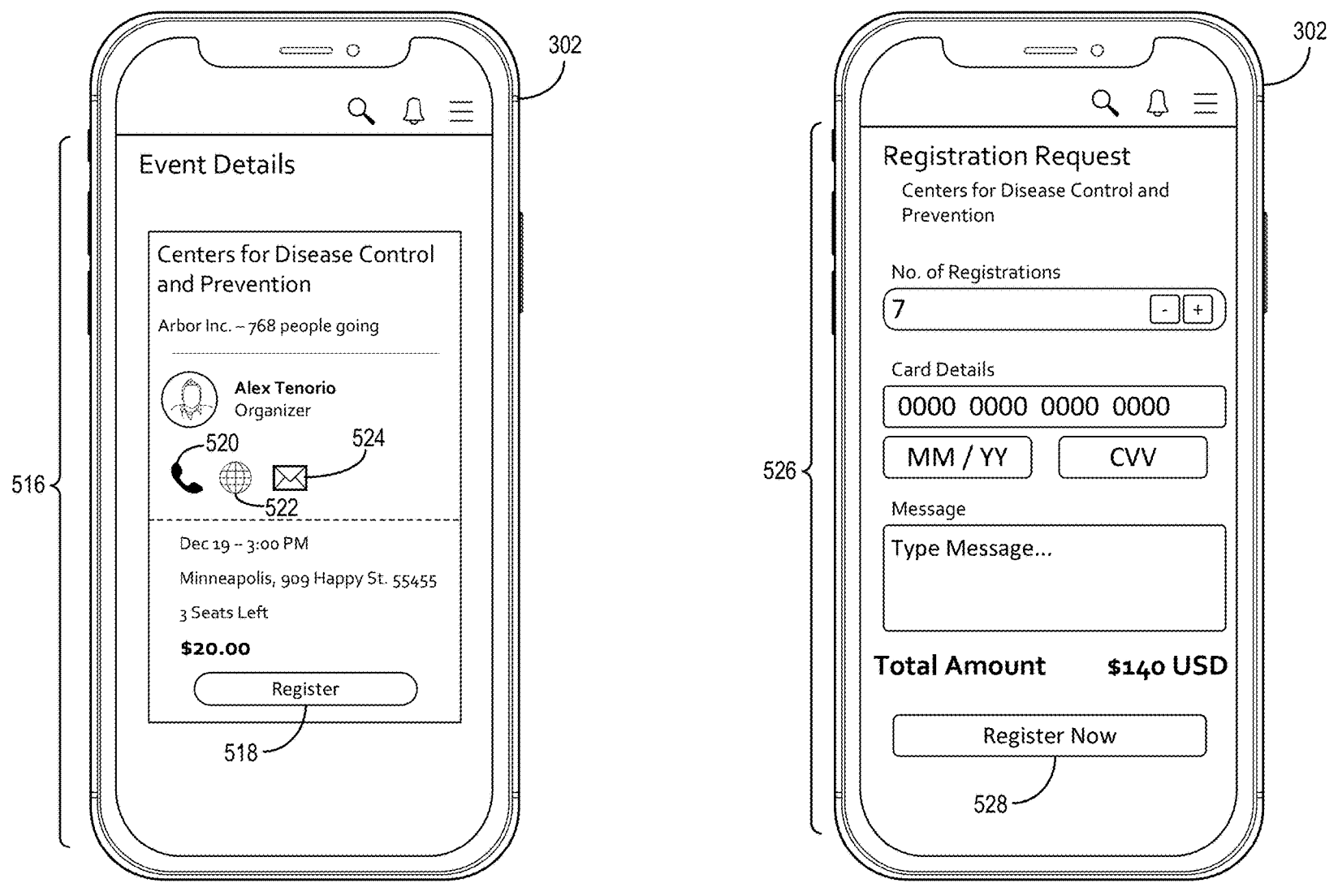

As mentioned, the affinity networking system 102 can provide an event interface based on user interaction with a digital event card. For example, the affinity networking system 102 can provide an event interface that includes additional information for the event associated with the digital event card 508 based on user interaction to select the digital event card 508. FIG. 5C illustrates an event interface 516 in accordance with one or more embodiments.

As illustrated in FIG. 5C, the client device(s) 302 displays the event interface 516 for the event "Centers for Disease Control and Prevention" of the digital event card 508. Within the event interface 516, the client device(s) 302 displays additional information about the event including the entity responsible for the event ("Arbor Inc"), the number of people registered ("768 people going"), the location ("Minneapolis, 909 Happy St. 55455"), the time ("December 19-3:00 PM"), the number of available seats ("3 seats left"), and the price of registration ("$20.00").

As shown, the event interface 516 further includes information about the event administrator responsible for the event. For example, the event interface 516 indicates that "Alex Tenorio" is the event administrator ("Organizer"). Further, the event interface 516 includes selectable elements such as the phone call element 520, the website element 522, and the email element 524. Based on user interaction with the phone call element 520, for example, the affinity networking system 102 provides a phone call interface pre-populated with the event administrator's phone number. Thus, the affinity networking system 102 enables the user to call the event administrator. Based on user interaction with the website element 522, the affinity networking system 102 opens a web browser and navigates to a website associated with the event administrator (or a website associated with the event or the entity in charge of the event). Based on user interaction with the email element 524, the affinity networking system 102 opens an email application (e.g., a default email application associated with the client device(s) 302) and a new email window pre-populated with the email address of the event administrator.

The event interface 516 further includes a registration element 518. Based on user interaction with the registration element 518, the affinity networking system 102 registers the user for the event. In some embodiments, the affinity networking system 102 performs a one-click registration, while in other embodiments, the affinity networking system 102 provides a registration interface. Indeed, the affinity networking system 102 can provide a registration interface based on user interaction with the registration element 228, the registration element 512, or the registration element 518. FIG. 5D illustrates a registration interface 526 in accordance with one or more embodiments.

As illustrated in FIG. 5D, the client device(s) 302 displays the registration interface 526 including various interactive elements such as fields for entering registration information and payment information. For instance, the registration interface 526 includes a field for entering a number of registrations ("No. of Registrations") to add for the event. As the user adds registrations (e.g., by selecting the "+" element), the affinity networking system 102 totals the cost for the registrations and provides a running total ("Total Amount $140 USD") for the cost of the registration for display within the registration interface 526.

In addition, the registration interface 526 includes fields ("Card Details") for entering payment information such as a credit card number, a credit card expiration, and a card verification number. The registration interface 526 further includes a field for entering text ("Message") to make a note to keep with the payment for the event. Based on user interaction with the registration confirmation element 528, the affinity networking system 102 registers the user for the event. The affinity networking system 102 further associates a particular number of tickets for the event with the user account based on the number of registrations submitted.

In addition to the registration interface 526, the affinity networking system 102 can generate and provide an entity interface based on user interaction with a digital entity card. In particular, the affinity networking system 102 can provide an entity interface that includes additional information associated with an entity. FIGS. 6A-6D illustrates an entity interface 602 including various individually displayed portions in accordance with one or more embodiments.

Figure 6B:
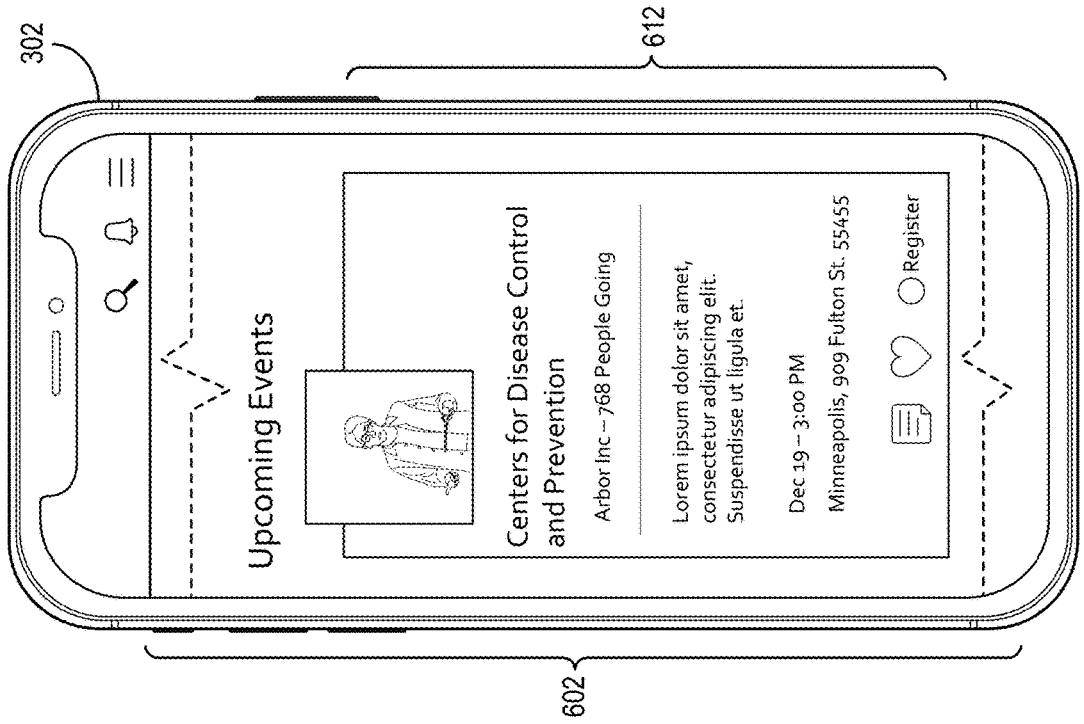
FIGS. 6A-6D illustrate an example entity interface in accordance with one or more embodiments.
Figure 6A:
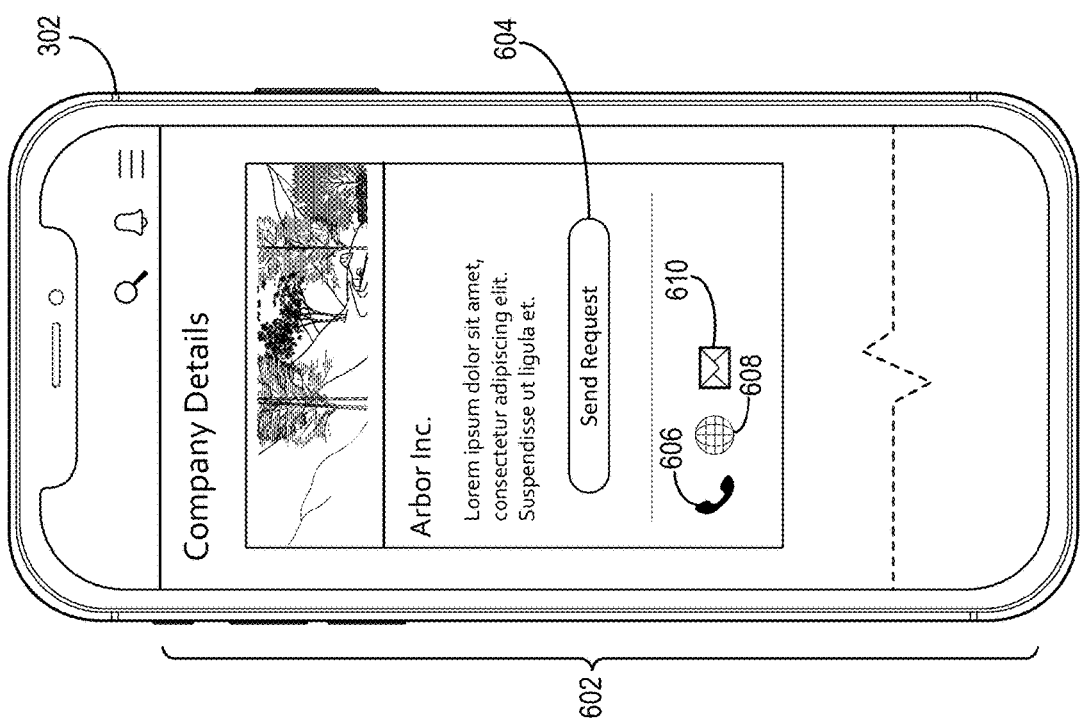

As illustrated in FIG. 6A, the client device(s) 302 displays the entity interface 602 including "Company Details" about a particular entity. Indeed, the entity interface 602 includes information pertaining to an entity associated with a digital entity card selected by a user. For example, the entity interface 602 includes the name of the entity ("Arbor Inc."), an entity profile picture, a description of the entity ("Lorem ipsum . . . "), and various interactive elements.

Indeed, the entity interface 602 includes a send request element 604 selectable to send a request to join a contact list or an interested user list associated with the entity. In addition, the entity interface 602 includes a phone call element 606 selectable to call a phone number associated with the entity. The entity interface 602 further includes a website element 608 selectable to open a website associated with the entity within a web browser. Additionally, the entity interface 602 includes an email element 610 selectable to send an email to an email address associated with the entity (e.g., via an email application).

The entity interface 602 is further scrollable and includes additional information for display in response to user interaction to scroll through the interface. Indeed, FIG. 6A includes a page break indicator (the dashed line with the sloping segments) indicating that the entity interface 602 continues below. FIG. 6B illustrates a continued portion of the entity interface 602 in accordance with one or more embodiments. As shown, the entity interface 602 includes "Upcoming Events" associated with the entity.

Figure 6D:
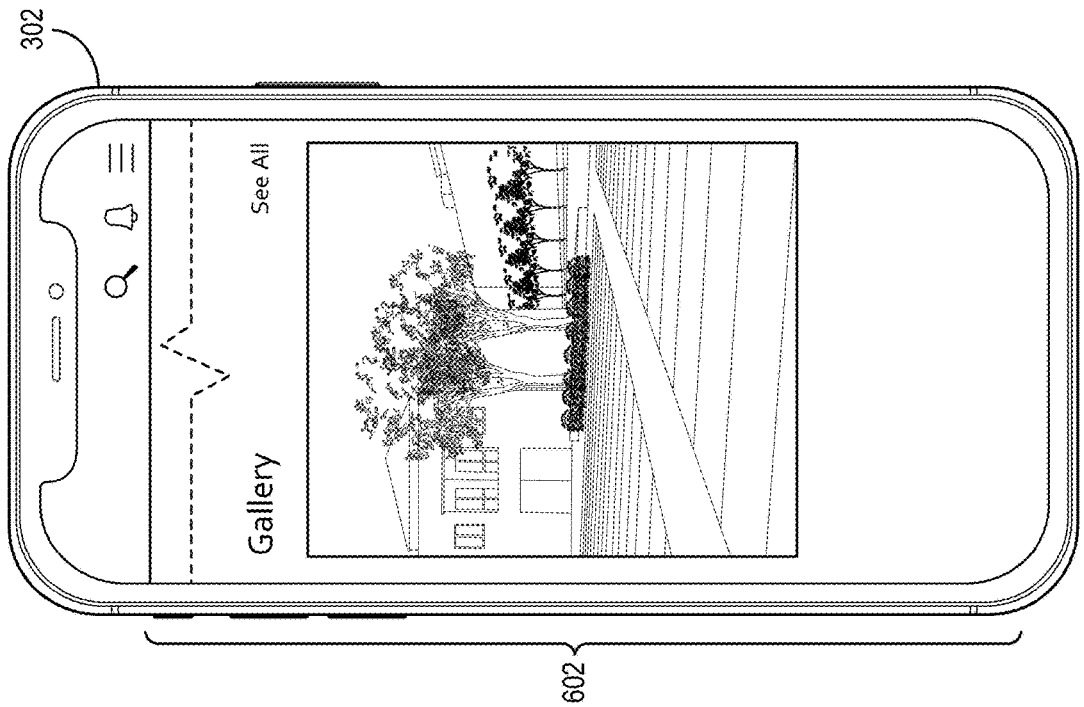
Figure 6C:
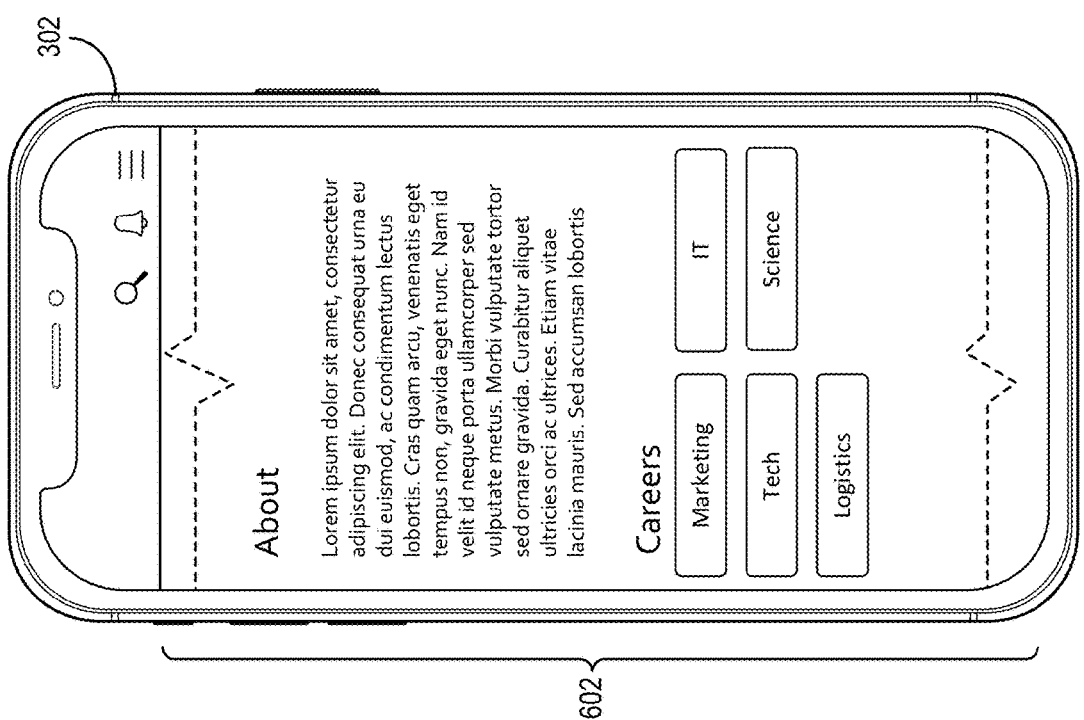

For example, the entity interface 602 includes a digital event card 612 that matches the digital event card 508, including a clip note element, an affinity element, and a registration element. The entity interface 602 can further include other events that the entity is putting on as well. As shown, the entity interface 602 is scrollable from the portion shown in FIG. 6B to additional portions. FIG. 6C illustrates another continued portion of the entity interface 602 in accordance with one or more embodiments.

As illustrated in FIG. 6C, the client device(s) 302 displays the entity interface 602 including a detailed description (the "About" section) of the entity along with "Careers" associated with the entity. For instance, the interface elements within the "Careers" section are selectable to navigate through specific career opportunities available with the entity. Based on user interaction with one of the elements, the affinity networking system 102 provides a career information interface that includes additional detail about the selected career, availability information for the career, desired credentials to fill the role, and/or instructions for how to apply.

FIG. 6C illustrates that the entity interface 602 is further scrollable to display additional information pertaining to the entity. In particular, the entity interface 602 can include a gallery of images, videos, or other media related to the entity that can provide context for users to, for example, see what an office space might look like at the entity's office building. FIG. 6D illustrates another continued portion of the entity interface 602 in accordance with one or more embodiments.

As shown, the client device(s) 302 displays the entity interface 602 including a gallery of images associated with the entity. The gallery includes images such as news spots, projects undertaken by the entity, employees of the entity, an office associated with the entity, or other images that an entity administrator adds to the gallery. In some embodiments, the gallery is scrollable to see additional images or else the affinity networking system 102 can provide a gallery interface in response to user interaction with the "See All" element.

Figure 7B:
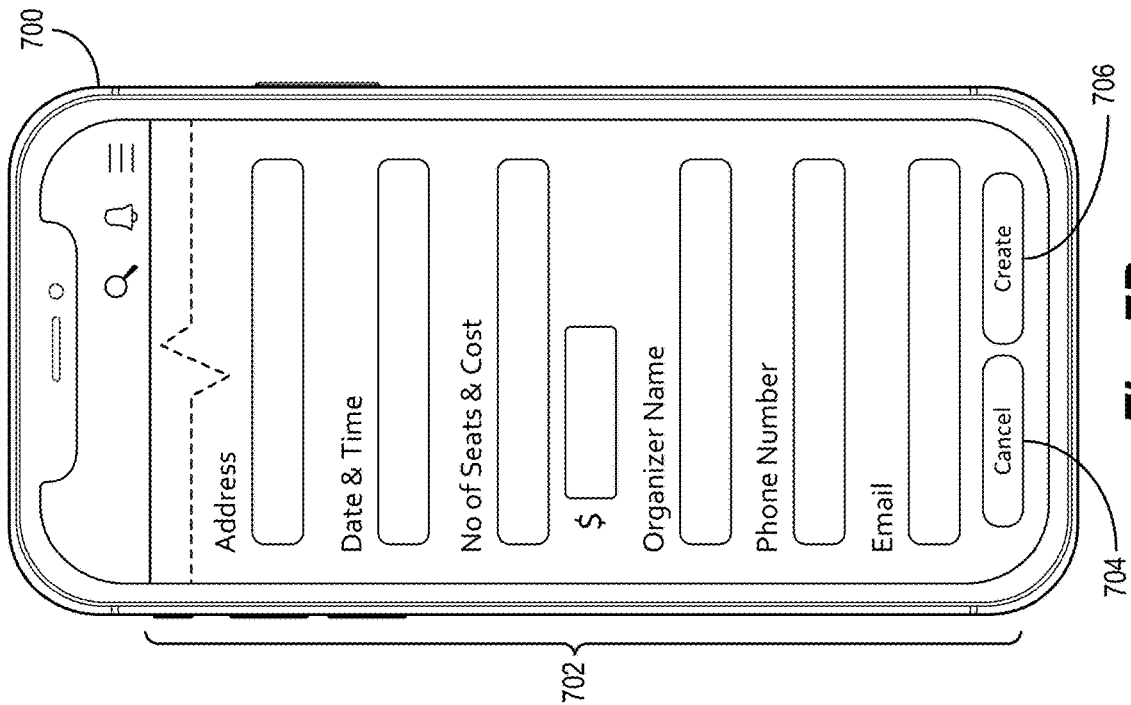
FIGS. 7A-7B illustrate an example event creation interface in accordance with one or more embodiments.
Figure 7A:
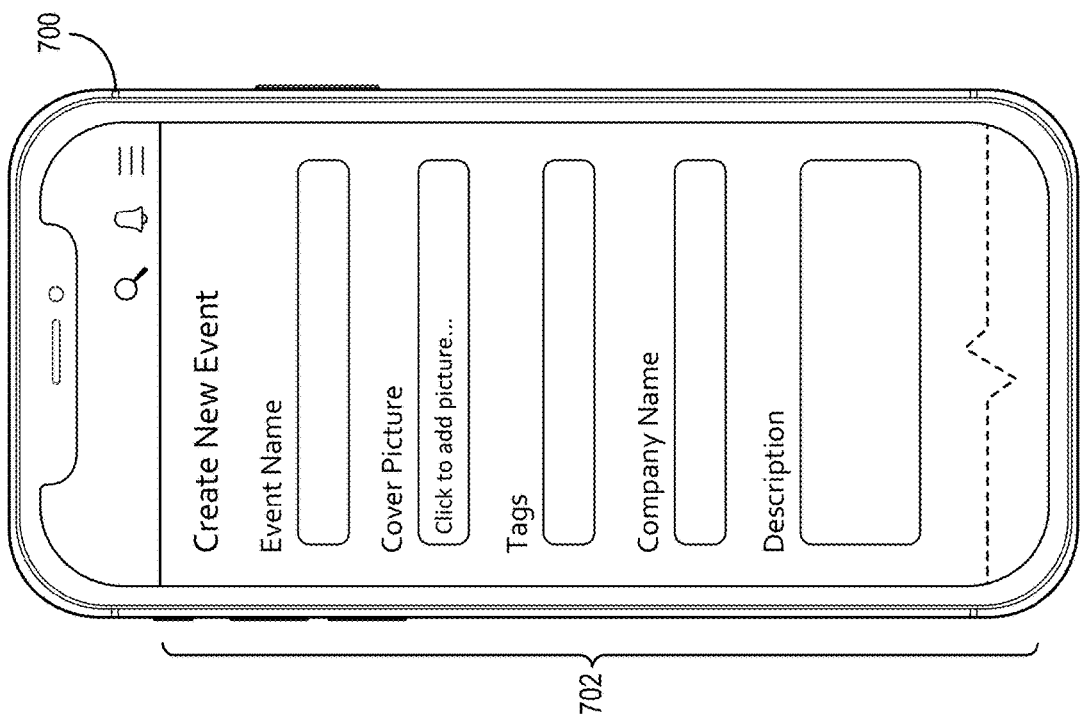

In some embodiments, the affinity networking system 102 can enable an event administrator to create an event. Indeed, the affinity networking system 102 can receive input from the event administrator device 106 including various event information for a new event to include within the affinity networking system 102. FIGS. 7A-7B illustrate an event administrator device 700 (e.g., the event administrator device 106) displaying an event creation interface 702 in accordance with one or more embodiments.

As shown in FIG. 7A, the event administrator device 700 displays the event creation interface 702 including various fields to enter event information. For example, the event creation interface 702 includes an "Event Name" field to name the event and a "Cover Picture" field to add a cover picture for the event (to display within a digital event card). In addition, the event creation interface 702 includes a "Tags" field to add particular tags for the event so that, when users search within the affinity networking system 102, the affinity networking system 102 determines tags that correspond to the queries and surfaces digital event cards for events with those tags within a query response. Further, the event creation interface 702 includes a "Company Name" field to enter an entity name associated with the event (e.g., a sponsoring entity or an organizing entity) and a "Description" field to enter a text description of the event.

As shown in FIG. 7B, the event administrator device 700 displays a continued portion of the event creation interface 702 including additional fields to enter event information as well as certain interactive elements. For example, the event creation interface 702 further includes an "Address" field to enter an address or a location of the event, a "Date & Time" field to enter a date and time for the event, and a "No of Seats & Cost" fields to enter a total number of available seats and a price per seat. The event creation interface 702 further includes an "Organizer Name" field to enter an event administrator name, a "Phone Number" field to enter a phone number associated with the event or the event administrator, and an "Email" field to enter an email address associated with the event or the event administrator.

As mentioned, the event creation interface 702 includes interactive elements. For example, the event creation interface 702 includes a cancel element 704 and a create element 706. Based on user interaction with the cancel element 704, the affinity networking system 102 cancels the creation of the event and exits the event creation interface 702. In some embodiments, the affinity networking system 102 provides a confirmation interface to verify that the user interaction with the cancel element 704 was deliberate rather than accidental (e.g., "Are you sure?").

Additionally, based on user interaction with the create element 706, the affinity networking system 102 generates an event based on the parameters and information provided via the event creation interface 702. Indeed, the affinity networking system 102 generates the event such that users can access and view a digital event card for the event, register for the event, view an event interface for the event, interact with the event administrator, and attend the event. The affinity networking system 102 further maintains the event by tracking registrations, processing payments, distributing payments to event administrators (or other appropriate parties), determining affinities associated with the event, facilitating communications with the event administrator, and (for virtual events) enabling users to attend the event.

Figure 8A:
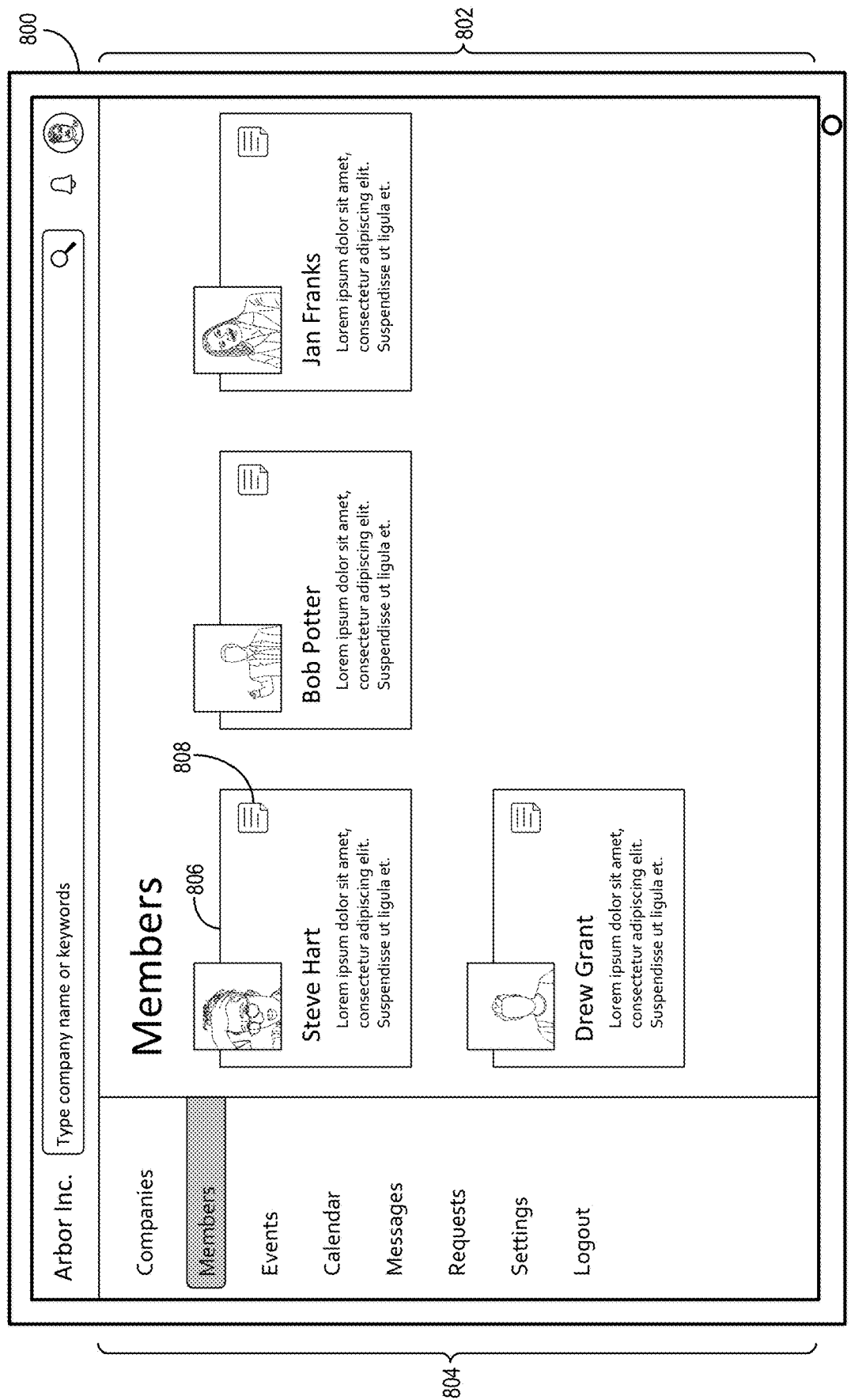
FIG. 8A illustrates an example event member interface in accordance with one or more embodiments.

As mentioned above, the affinity networking system 102 can generate a private digital clip note based on user interaction with a clip note element. In particular, the affinity networking system 102 can provide an event member displaying digital co-user cards that include clip note elements. FIG. 8A illustrates an example event member interface 802 (e.g., the event member interface 226) including various digital co-user cards in accordance with one or more embodiments.

As illustrated in FIG. 8A, the client device 800 (e.g., one of the client device(s) 110) displays the event member interface 802 along with a navigation menu 804. Based on user interaction selecting the "Members" option from the navigation menu 804, the affinity networking system 102 provides the event members interface 802. In addition, the event member interface 802 includes one or more digital co-user cards (e.g., for co-users registered for a particular event or for co-users for whom the user has an affinity) such as the digital co-user card 806. Further, the digital co-user card 806 includes a clip note element 808 selectable to generate a private digital clip note in relation to the co-user of the digital co-user card 806 ("Steve Hart"). Likewise, the other digital co-user cards include respective clip note elements for generating private digital clip notes in relation to the corresponding co-users.

Figure 8B:
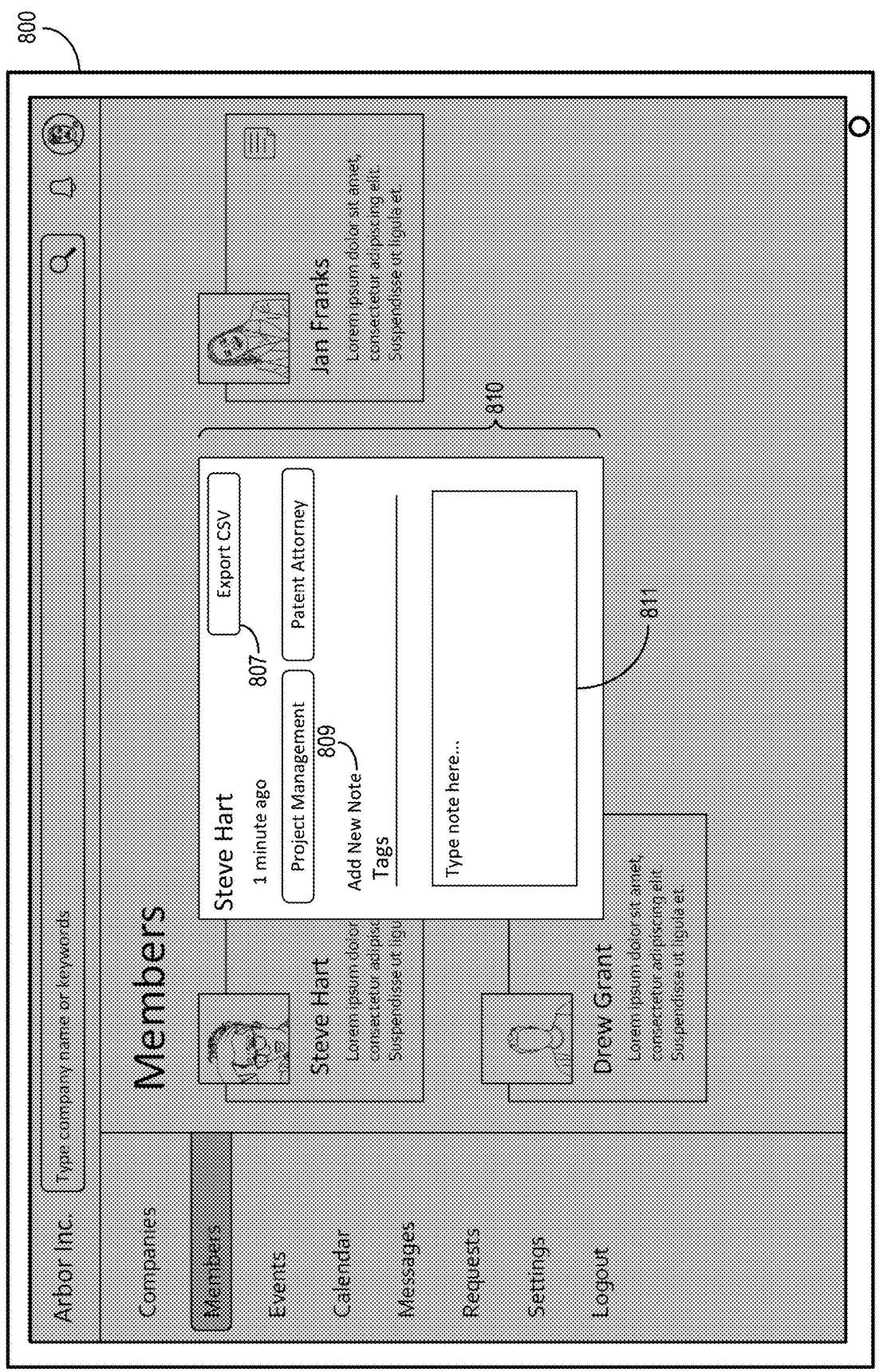
FIG. 8B illustrates an example clip note interface in accordance with one or more embodiments.

In some embodiments, in response to user interaction with a clip note element, the affinity networking system 102 provides a clip note interface for generating a private digital clip note. FIG. 8B illustrates the client device 800 displaying a clip note interface 810 in accordance with one or more embodiments. As shown, the affinity networking system 102 provides the clip note interface 810 based on user interaction with the clip note element 808 to generate a private digital clip note for Steve Hart.

Indeed, the clip note interface 810 includes an indication of tags associated with the co-user Steve Hart (e.g., a "Project Management" tag and a "Patent Attorney" tag). In addition, the clip note interface 810 includes a tag generation field 809 and a text field 811. Within the tag generation field 809, the user can enter tags to associate with the co-user Steve Hart. Within the text field 811, the user can enter freeform text to include as part of the private digital clip note for Steve Hart. Thus, the affinity networking system 102 receives information from the client device 800 including tags and text to include within a private digital clip note for Steve Hart.

In some embodiments, the clip note interface 810 includes additional fields or elements for including additional information within a private digital clip note. For example, the clip note interface 810 includes a voice recording element to record audio for the private digital clip note. In one or more embodiments, the affinity networking system 102 transcribes the audio into text to include the text instead of (or in addition to) the audio as part of the private digital clip note. As another example, in some embodiments the clip note interface 810 includes a display of previously generated private digital clip notes associated with the particular co-user (or entity or event). Thus, the clip note interface 810 can include a listing of private digital clip notes associated with Steve Hart (e.g., in chronological order).

In one or more embodiments, the affinity networking system 102 can add additional information to a private digital clip note. For instance, the clip note interface 810 can include a camera element selectable to use a camera associated with the client device 800 or an upload element selectable to upload an image, a video, or an audio file to include with the private digital clip note. For example, the affinity networking system 102 can receive a picture of a business card to include with the private digital clip note. In some embodiments, the affinity networking system 102 can analyze the business card (e.g., via one or more image recognition techniques such as machine learning models) to convert recognized words into text to include within the private digital clip note. Further, the affinity networking system 102 can utilize QR scanning functionality to scan bar codes to add additional encoded information to a private digital clip note.

Based on user input to provide tags and/or other information with a private digital clip note, the affinity networking system 102 generates the private digital clip note to store within a database (e.g., the database 118). As mentioned, above, the affinity networking system 102 further encrypts the private digital clip note utilizing a public key associated with the user. Thus, the affinity networking system 102 stores encrypted private digital clip notes for access by the user at a later time.

In addition to interface elements for generating tags and other information to include in a private digital clip note, the clip note interface 810 further includes an export element 807. In particular, the affinity networking system 102 exports the private digital clip note created within the clip note interface 810 in response to user interaction with the export element 807. As mentioned above, for instance, the affinity networking system 102 exports the private digital clip note to a different format compatible with other CRM systems. For example, in some embodiments, the affinity networking system 102 exports the private digital clip note to a CSV file. Thus, if a particular entity utilizes a different CRM system to manage an event that the user desires to attend, the affinity networking system 102 exports the private digital clip note so that the information found within the private digital clip note is accessible to user within the other CRM system.

Figure 8C:
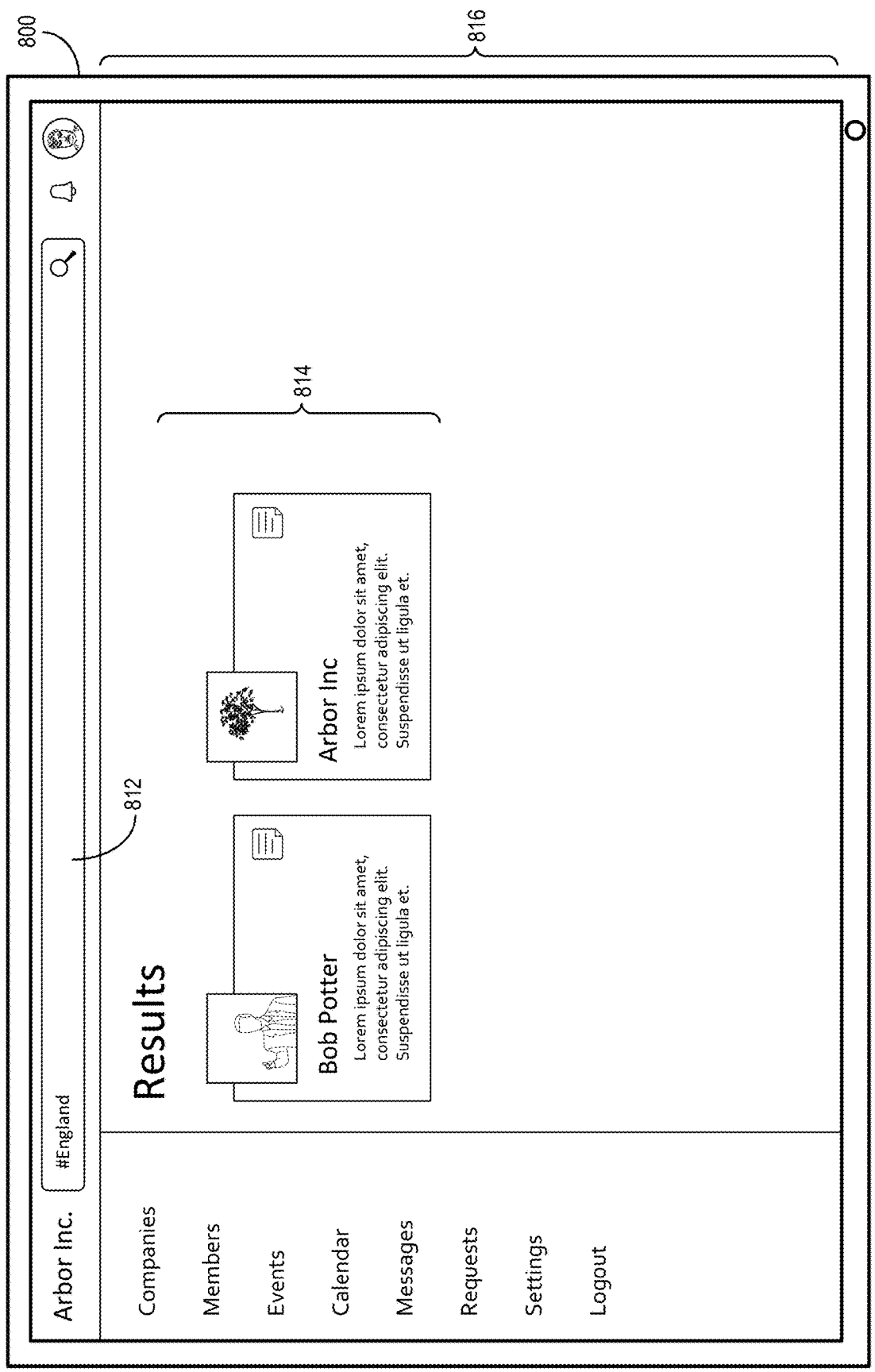
FIG. 8C illustrates an example query response interface in accordance with one or more embodiments.

As mentioned, the affinity networking system 102 can generate and provide a query response based on a query received from a client device (e.g., the client device 800 or the client device(s) 302). In particular, the affinity networking system 102 can perform a search to identify digital co-user cards, digital event cards, and/or digital entity cards that correspond to one or more terms of a query. FIG. 8C illustrates a query response interface 816 including a query response 814 in accordance with one or more embodiments.

As illustrated in FIG. 8C, the client device 800 displays a query element 812 whereby a user can input a query such as "#England." In addition, the client device 800 displays a query response interface 816 wherein the affinity networking system 102 provides a query response 814 for display. Particularly, the affinity networking system 102 receives the query "#England" and, in response, performs a search to identify tags that match or otherwise correspond to the query. In some embodiments, the query includes terms without hashtags ("#") to generate a query response that includes digital co-user cards, digital event cards, and/or digital entity cards that correspond to the terms but that do not necessarily have an associated tag that matches the terms.

Indeed, the affinity networking system 102 searches through information such as co-user profile information, event information, entity information, and private digital clip notes associated with the user to generate the query response 814. As mentioned, the affinity networking system 102 decrypts and searches the encrypted private digital clip notes of the user to identify those private digital clip notes that correspond to the query. Upon identifying a private digital clip note that corresponds to the query, the affinity networking system 102 further identifies the digital event card, the digital co-user card, or the digital entity card associated with the private digital clip note. For example, the affinity networking system 102 identifies the digital co-user card for "Bob Potter" as a digital co-user card for which the user created a private digital clip note that includes a tag of "#England." Thus, the affinity networking system 102 provides the identified digital co-user card for "Bob Potter" within the query response 814.

In a similar fashion, the affinity networking system 102 searches private digital clip notes associated with digital entity cards and digital event cards to identify those digital entity cards and digital event cards that have associated private digital clip notes containing the tag "#England." As shown in FIG. 8C, the affinity networking system 102 identifies the digital entity card for "Arbor Inc" to include within the query response 814. Thus, the affinity networking system 102 generates the query response 814 by identifying the digital co-user card for "Bob Potter" and the digital entity card for "Arbor Inc" and providing them for display within the query response interface 816. As also shown, the digital entity card for "Arbor Inc" includes a clip note element (represented by the lined paper icon with the folded corner) selectable for generating a private digital clip note for the entity Arbor Inc.

In some embodiments, the affinity networking system 102 dynamically generates custom tags based on queries. To elaborate, the affinity networking system 102 generates a custom tag that includes a particular query term and associates the custom tag with digital co-user cards, digital event cards, and/or digital entity cards included as part of a query response for the particular query term. For example, the affinity networking system 102 generates a custom tag of "#England" to associate with a digital co-user card, a digital event card, or a digital entity card based on identifying the card(s) via a search.

In one or more embodiments, the affinity networking system 102 provides selectable tag elements for a user to select for performing quick searches on particular tags. For instance, the affinity networking system 102 generates selectable tag elements for terms entered as part of a query and provides them for display underneath a search bar. Indeed, based on user interaction with a tag element, the affinity networking system 102 identifies the selected tag as a query and performs a search as described herein.

Figure 8D:
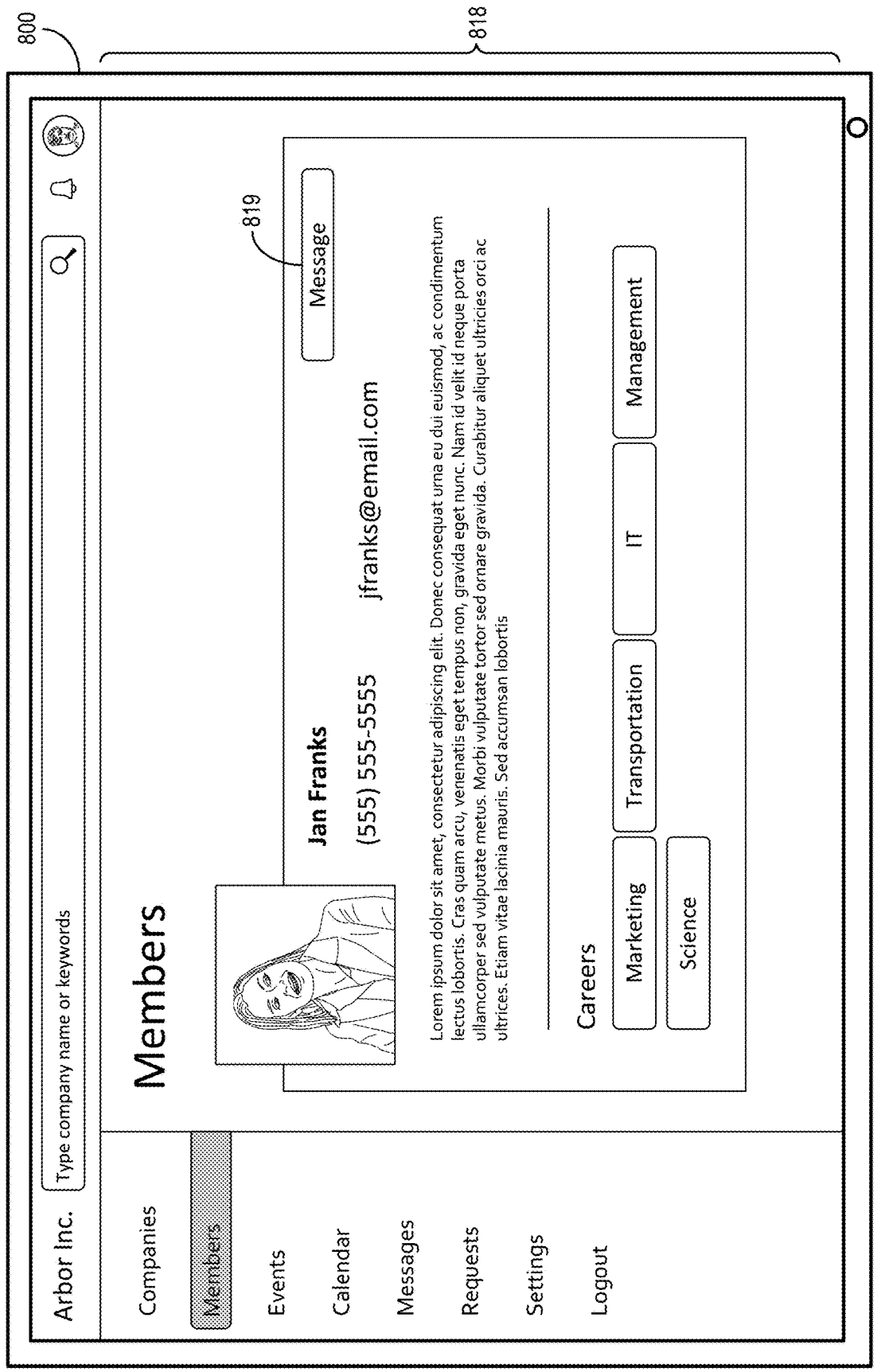
FIG. 8D illustrates an example co-user interface in accordance with one or more embodiments.

As mentioned above, the affinity networking system 102 can further provide a co-user interface to access additional information about a co-user. In particular, the affinity networking system 102 can provide a co-user interface based on user interaction to select a digital co-user card. FIG. 8D illustrates an example co-user interface 818 in accordance with one or more embodiments.

As illustrated in FIG. 8D, the client device 800 displays the co-user interface 818 including information about a co-user "Jan Franks." Particularly, in response to user interaction selecting a digital co-user card for "Jan Franks," the affinity networking system 102 provides the co-user interface 818 for display on the client device 800. Within the co-user interface 818, the client device 800 displays information such as the name of the co-user ("Jan Franks"), the phone number of the co-user, the email address of the co-user, and a description of the co-user ("Lorem ipsum . . . "). In addition, the co-user interface 818 includes a "Careers" section indicating types of careers that Jan Franks is interested in and/or for which Jan Franks has an affinity. Thus, the affinity networking system 102 facilitates a user or an entity administrator networking with Jan Franks to provide career information or opportunities.

Figure 8E:
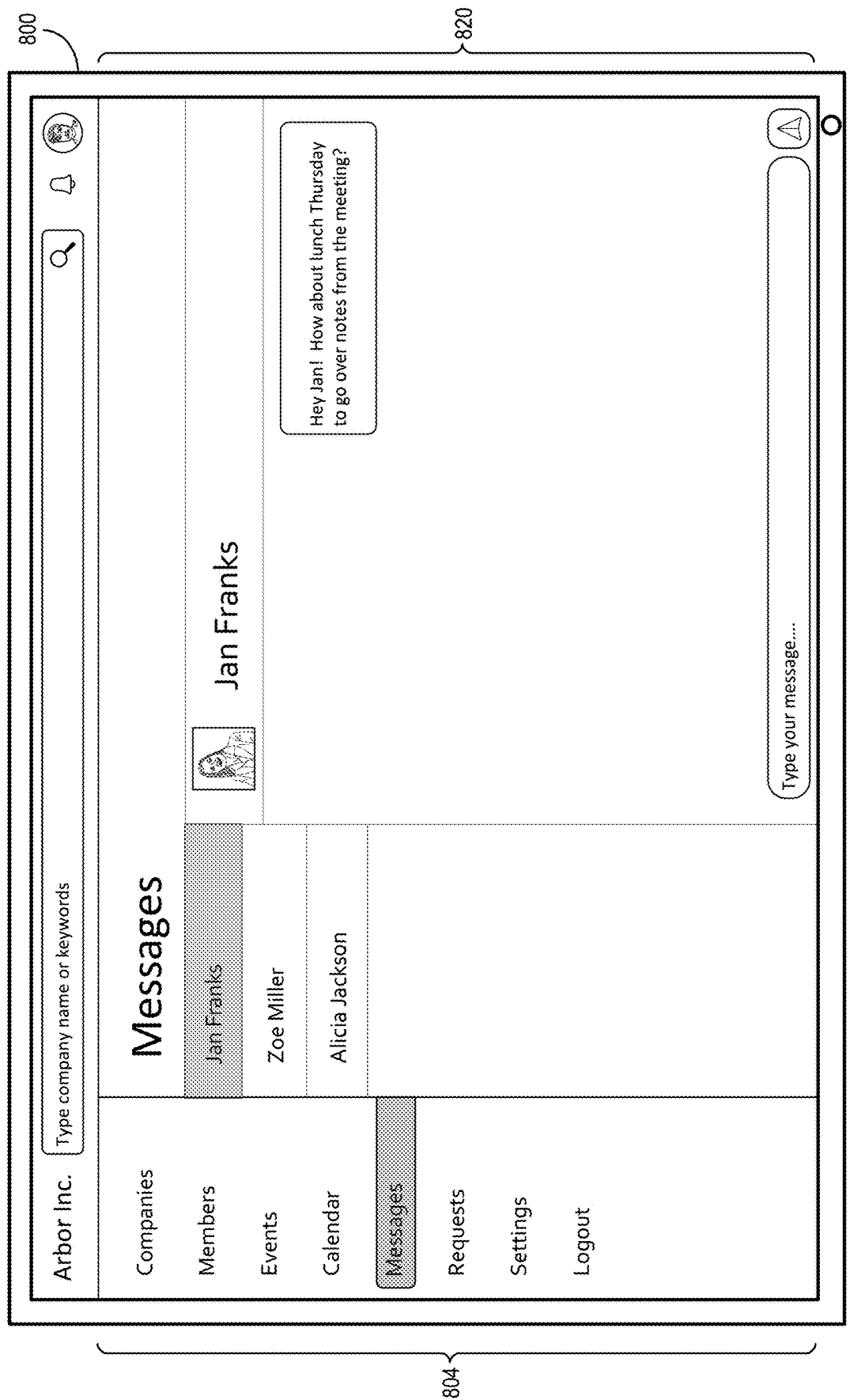
FIG. 8E illustrates an example messages interface in accordance with one or more embodiments.

As further illustrated in FIG. 8D, the co-user interface 818 includes a messages element 819. In response to user interaction with the messages element 819, the affinity networking system 102 can provide a messages interface for display on the client device 800. In particular, the affinity networking system 102 can provide a messages interface including a messages thread for communicating with the co-user Jan Franks. FIG. 8E illustrates a messages interface 820 in accordance with one or more embodiments.

As shown in FIG. 8E, the client device 800 displays the messages interface 820 including a messages thread for communicating with Jan Franks. Indeed, as indicated within the navigation menu 804, the client device 800 navigates directly to the messages thread with the particular co-user in response to user interaction selecting the messages element 819. Additionally, the messages interface 820 includes a messages thread menu 821 whereby the user can select between communication threads with different co-users. Via the messages interface 820, the affinity networking system 102 facilitates communication between the user and other co-users as well as entity administrators and event administrators.

Figure 8F:
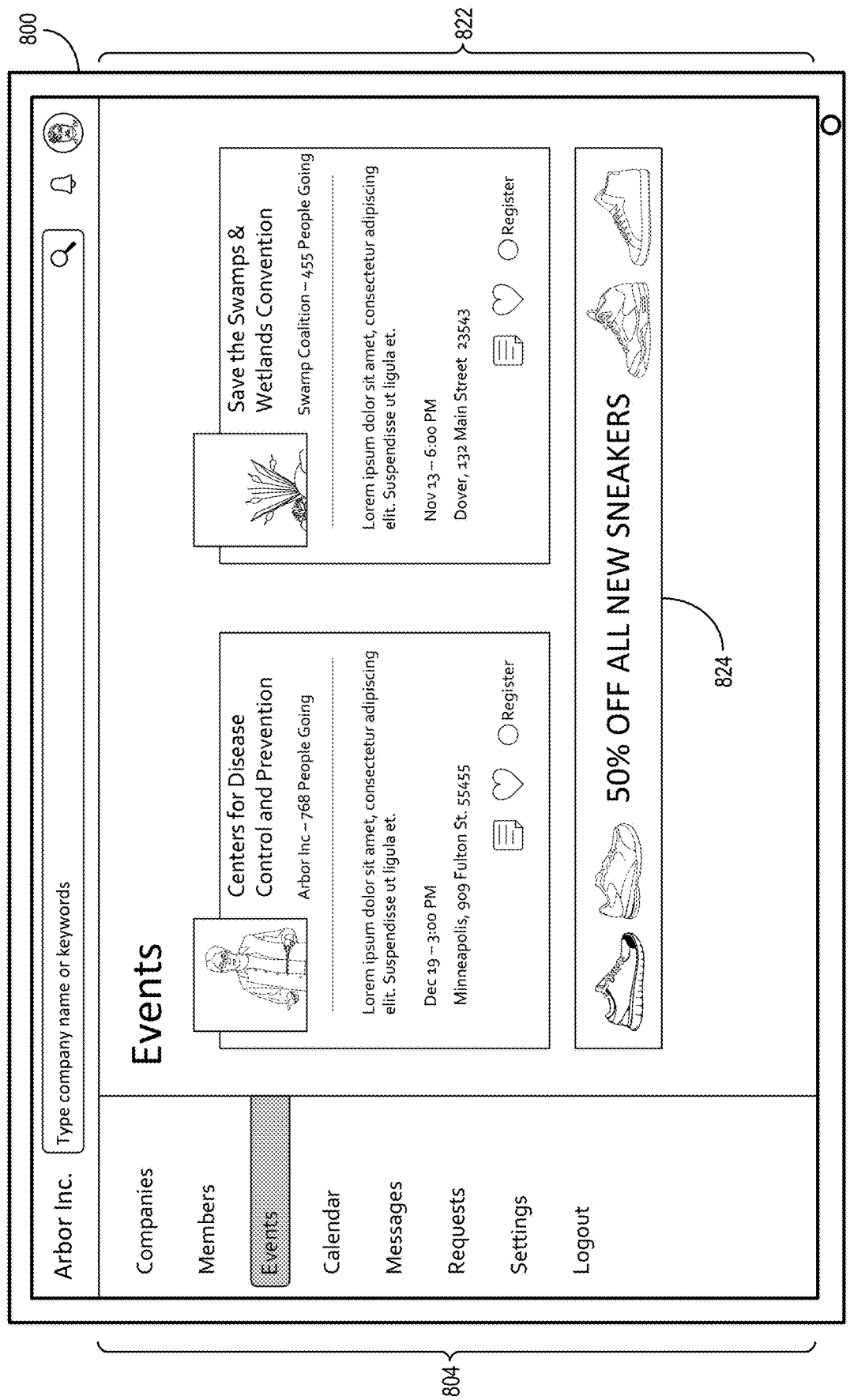
FIG. 8F illustrates an example event summary interface including a targeted digital content item in accordance with one or more embodiments.

As mentioned above, the affinity networking system 102 can provide targeted digital content for display within a user interface. In particular, the affinity networking system 102 can receive digital content from an entity administrator device (e.g., the entity administrator device 108) or an event administrator device (e.g., the event administrator device 106) and can target the digital content for a particular user. FIG. 8F illustrates an event summary interface 822 including a targeted digital content item 824 in accordance with one or more embodiments.

As shown in FIG. 8F, the client device 800 displays the event summary interface 822 including various digital event cards along with a targeted digital content item 824. Indeed, the affinity networking system 102 generates and provides the targeted digital content item 824 for display within the event summary interface 822 based on affinities associated with the user of the client device 800. To elaborate, the affinity networking system 102 determines that the user has an affinity for particular entities, events, and/or co-users and provides targeted digital content based on the affinities.

For example, based on user interactions with particular co-users, entities, and events, the affinity networking system 102 determines that the user of the client device 800 has an affinity for sneakers. As a result, the affinity networking system 102 generates the targeted digital content item 824 and provides the targeted digital content item 824 for display within the event summary interface 822. In some embodiments, the affinity networking system 102 provides targeted digital content for display in different locations within the event summary interface 822 and/or within different interfaces such as an event member interface.

Figure 9:
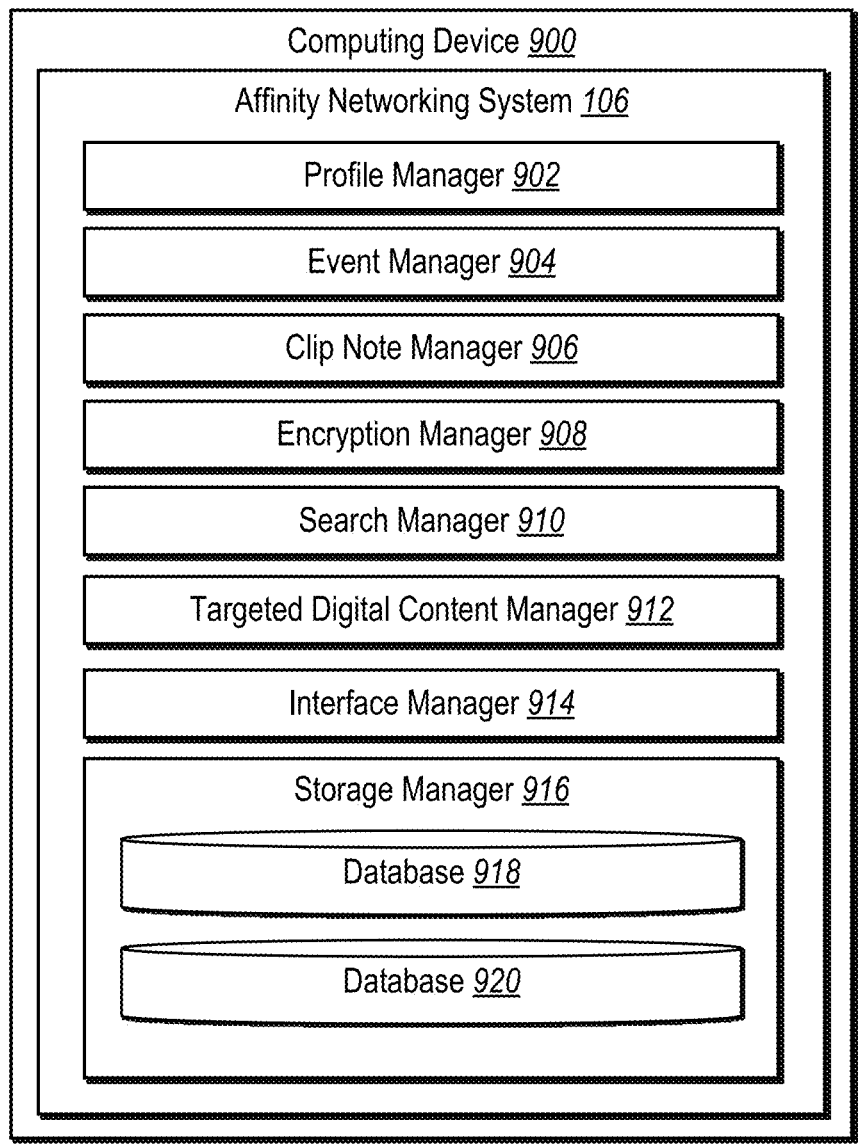
FIG. 9 illustrates a schematic diagram of an affinity networking system in accordance with one or more embodiments.

Looking now to FIG. 9, additional detail will be provided regarding components and capabilities of the affinity networking system 102. Specifically, FIG. 9 illustrates an example schematic diagram of the affinity networking system 102 on an example computing device 900 (e.g., one or more of the client device(s) 110, the entity administrator device 108, the event administrator device 106, and/or the server(s) 104). As shown in FIG. 9, the affinity networking system 102 may include a profile manager 902, an event manager 904, a clip note manager 906, an encryption manager 908, a search manager 910, a targeted digital content manager 912, an interface manager 914, and a storage manager 916. The storage manager 916 can include one or more memory devices (e.g., the database 918 and the database 920) that store various data such as private digital clip notes, targeted digital content, user profile information, event information, entity information, communications, and affinity information.

As just mentioned, the affinity networking system 102 includes a profile manager 902. In particular, the profile manager 902 manages, maintains, generates, or identifies various profiles within the affinity networking system 102. For example, the profile manager 902 generates and maintains user profiles and entity profiles. The profile manager 902 further determines affinities between profiles based on monitoring interactions such as communications, selections interface elements, views of various digital cards, and other affinity factors as described above. The profiles manager 902 further enables users and/or entity administrators to edit profiles, create events, and initiate communications.

As shown, the affinity networking system 102 also includes an event manager 904. The event manager 904 can manage, maintain, generate, register, or identify events within the affinity networking system 102. In particular, the event manager 904 can generates events based on input from an event administrator device (e.g., the event administrator device 106). The event manager 904 can further identify, detect, or determine registrations for an event based on input from one or more client devices (e.g., the client device(s) 110). Additionally, the event manager 904 can determine affinities associated with events based on interactions from users, private digital clip notes, other factors as described above. The event manager 904 can further facilitate virtual attendance of an online event via digital video conferencing, webcams, or other relevant technology.

Additionally, the affinity networking system 102 includes a clip note manager 906. The clip note manager 906 can manage, maintain, generate, store, provide, or identify private digital clip notes. Particularly, the clip note manager 906 can generate a private digital clip note based on user interaction with a clip note element. For example, the clip note manager 906 can receive user input via a clip note interface to create tags or other information to include within a private digital clip note for a user, an entity, or an event.

The affinity networking system 102 further includes an encryption manager 908. The encryption manager 908 can manage, maintain, determine, process, implement, or cause encryption of one or more private digital clip notes (or other digital content). In particular, the encryption manager 908 can encrypt a private digital clip note utilizing a server associated with a public key. In addition, the encryption manager 908 can encrypt and store a generated private digital clip note utilizing a public key associated with a user.

Additionally, the affinity networking system 102 includes a search manager 910. The search manager 910 can manage, perform, determine, or implement a decryption and a search. In particular, the search manager 910 can decrypt and search private digital clip notes created by a user by utilizing a private key associated with the user. The search manager 910 can further search other information such as co-user profile information and event information in response to a query. By maintaining private digital clip notes specific to co-users, events, or entities, the search manager 910 determines and provides such event-, entity-, or co-user-specific contexts for the private digital clip notes.

Further, the affinity networking system 102 includes a targeted digital content manager 912. In particular, the targeted digital content manager 912 can manage, determine, generate, provide, display, target, or identify targeted digital content. For example, the targeted digital content manager 912 can generate targeted digital content based on user interactions and/or affinities. The targeted digital content manager 912 can further provide the targeted digital content for display within a particular user interface (e.g., an event member interface or an event summary interface).

Further, the affinity networking system 102 includes an interface manager 914. In particular, the interface manager 914 manages, maintains, generates, displays, provides for display, presents, or populates various user interfaces associated with the affinity networking system 102. For example, the interface manager 914 provides an event member interface, and event summary interface, a messages interface, a co-user interface, an entity interface, or some other interface associated with the affinity networking system 102. The interface manager 914 further provides various elements within the interfaces as describes herein. In addition, the interface manager 914 receives, detects, determines, or identifies user interactions with, or selections of, various elements and/or inputs of queries.

As shown, the affinity networking system 102 also includes a storage manager 916. In particular, the storage manager 916 manages, maintains, stores, accesses, and provides various data to and from the database 918 and the database 920. For example, the storage manager 916 can store user profile information, entity information, and/or event information within the database 918 and/or the database 920. In addition, the storage manager 916 communicates with the profile manager 902 and/or the encryption manager 908 to store a public key and one or more encrypted private digital clip notes in the database 918 (e.g., the database 118). In addition, the storage manager 916 communicates with the profile manager 902 and/or the search manager 910 to store a private key on the database 920 (e.g., the database 120) and/or to access the private key as well as decrypted private digital clip notes.

The components of the affinity networking system 102 can include software, hardware, or both. For example, the components of the affinity networking system 102 can include one or more instructions stored on a computer-readable storage medium and executable by processors of one or more computing devices (e.g., the computing device 900). When executed by the one or more processors, the computer-executable instructions of the affinity networking system 102 can cause the computing device 900 to perform the methods described herein. Alternatively, the components of the affinity networking system 102 can comprise hardware, such as a special purpose processing device to perform a certain function or group of functions. Additionally or alternatively, the components of the affinity networking system 102 can include a combination of computer-executable instructions and hardware.

Furthermore, the components of the affinity networking system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the affinity networking system 102 may be implemented as part of a stand-alone application on a personal computing device or a mobile device.

FIGS. 1-9, the corresponding text, and the examples provide a number of different systems, methods, and non-transitory computer readable media for generating a query response based on searching private digital clip notes of a user associated with an event. In addition to the foregoing, embodiments can also be described in terms of flowcharts comprising acts for accomplishing a particular result. For example, FIG. 10 illustrates a flowchart of an example sequence or series of acts in accordance with one or more embodiments.

Figure 10:
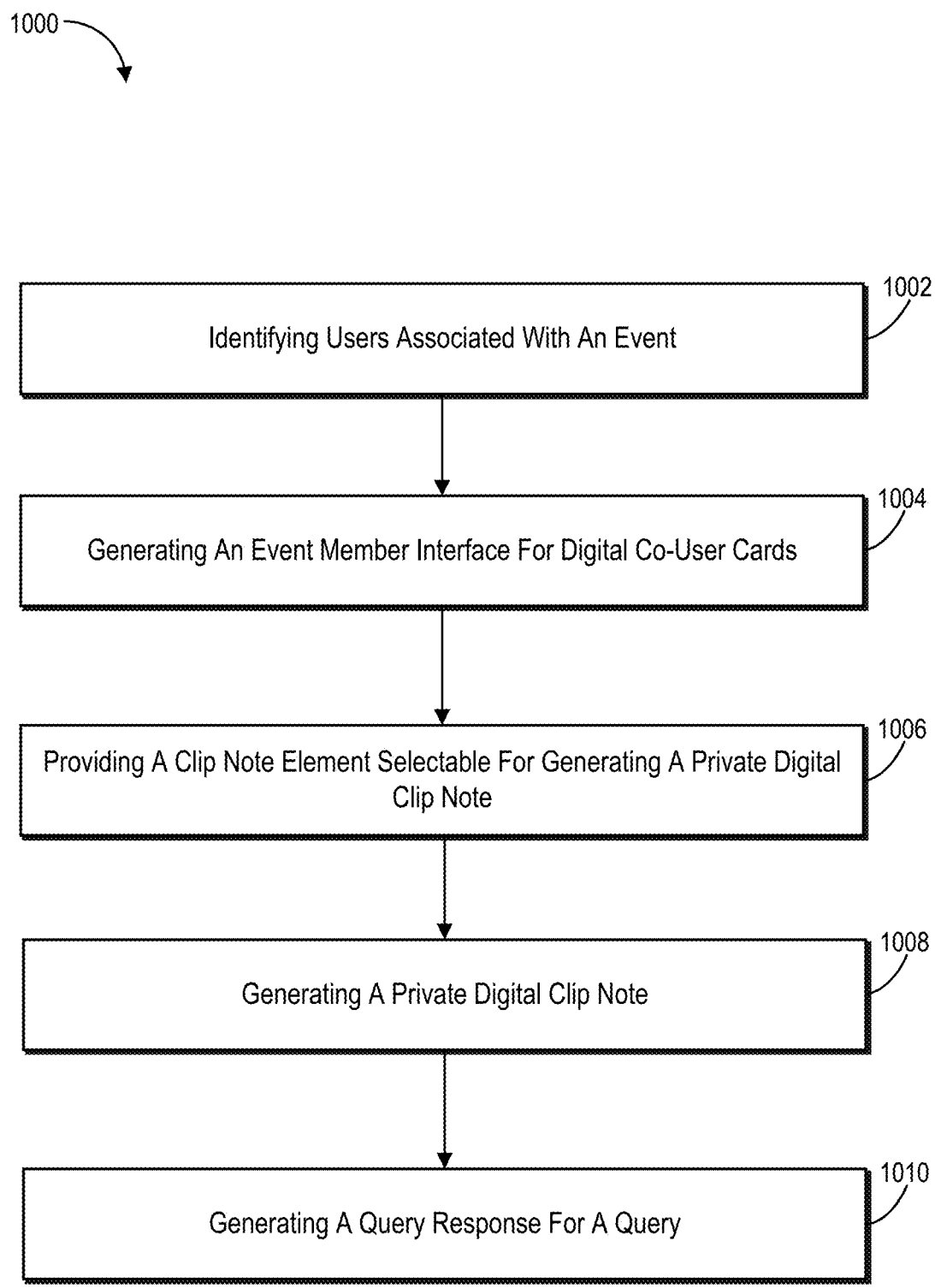
FIG. 10 illustrates a flowchart of a series of acts for generating a query response based on searching private digital clip notes of a user associated with an event in accordance with one or more embodiments.

While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 for generating a query response based on searching private digital clip notes of a user associated with an event. In particular, the series of acts 1000 includes an act 1002 of identifying users associated with an event. For example, the act 1002 can involve identifying a user and one or more co-users associated with an event registered within an affinity networking system.

In addition, the series of acts 1000 includes an act 1004 generating an event member interface for digital co-user cards. Particularly, the act 1004 can involve providing, for display on a client device associated with the user, an event member interface including one or more digital co-user cards that include profile information for the one or more co-users associated with the event. In some embodiments, the series of acts 1000 can include an act of providing, for display within a digital event card displayed within the event summary interface: a clip note element selectable for entering private digital clip notes associated with an event corresponding to the digital event card and a registration element selectable for registering the user to attend the event corresponding to the digital event card. The series of acts 1000 can also include an act of providing, for display together with the clip note element and the registration element within the digital event card, an affinity element selectable for indicating an affinity for the event associated with the digital event card.

The series of acts 1000 can include an act of, in response to selection of the registration element, registering the user with the event. Additionally, the series of acts 1000 can include an act of, in response to registering the user with the affinity networking system, generating a public key and a private key for storage on different databases associated with different servers. The series of acts 1000 can include an act of encrypting the private digital clip note utilizing the public key and an act of, in response to a query, decrypt one or more encrypted private digital clip notes utilizing the private key.

Further, the series of acts 1000 includes an act 1006 of providing a clip note element selectable for generating a private digital clip note. In particular, the act 1006 can involve providing, for display within a digital co-user card displayed within the event member interface, a clip note element selectable for entering private digital clip notes associated with a co-user corresponding to the digital co-user card. In addition, the series of acts 1000 can include an act of, in response to user interaction with the clip note element, generating a private digital clip note including user-generated digital text associated with the event for storage within a database and for retrieval by one or more client devices associated with the user. The series of acts 1000 can also include an act of, providing, for display on the client device and in response to the user interaction with the clip note element, a clip note interface including: a tag generation field for generating tags associated with the digital event card and a text field for entering digital text-based notes associated with the digital event card.

The series of acts 1000 further includes an act 1008 of generating a private digital clip note. In particular, the act 1008 can involve, based on user interaction with the clip note element via the client device associated with the user, generating a private digital clip note associated with the co-user. In some embodiments, the series of acts 1000 includes acts of providing, for display on the client device, an event summary interface including one or more digital event cards associated with one or more events registered within the system and providing, for display within a digital event card displayed within the event summary interface, a second clip note element for generating private digital clip notes associated with an event corresponding to the digital event card and a registration element for registering to attend the event corresponding to the digital event card. The series of acts 1000 can include an act of, in response to user interaction with the registration element, providing, for display on the client device, a registration interface for registering the user for the event corresponding to the digital event card.

As shown, the series of acts 1000 also includes an act 1010 of generating a query response for a query. Particularly, the act 1010 can involve, in response to a query from one or more client devices corresponding to the user, generating a query response based on the private digital clip note corresponding to the co-user. The series of acts 1000 can further include an act of providing, for display on the client device in response to the user interaction with the clip note element, a clip note interface including a tag generation field for generating tags associated with the digital co-user card as part of the private digital clip note. In addition, the series of acts 1000 can include an act of, based on user interaction with the tag generation field, generating a tag associated with the digital co-user card. Further, the act 1010 can involve identifying the tag within the private digital clip note and corresponding to the query.

In some embodiments, the act 1010 can involve searching private digital clip notes created by the user as well as profile information associated with co-users of the affinity networking system, company information associated with companies registered with the affinity networking system, and event information associated with events registered with the affinity networking system. Further, the act 1010 can involve, based on the searching, identifying a digital co-user card of a co-user who attended a previous event which the user also attended.

The series of acts 1000 can include an act of generating, in response to registration of the user with the affinity networking system: a public key stored on a first database of a first server, and a private key stored on a second database of a second server separate from the first server. Further, the series of acts 1000 can include an act of utilizing the public key to encrypt the private digital clip note for storage within the first database.

In some embodiments, the act 1010 can also involve, in response to the query, utilizing the second server to apply the private key stored on the second database to generate decrypted private digital clip notes from the encrypted private digital clip notes. Further, the act 1010 can involve, searching the decrypted private digital clip notes to identify (in parallel), based on the query, the private digital clip note associated with the co-user to include within the query response.

Indeed, the act 1010 can involve searching the decrypted private digital clip notes generated via the private key to identify one or more decrypted private digital clip notes corresponding to the query. The first database can be maintained by a first server and the second database can be maintained by a second server separate from the first server. Thus, generating the decrypted private digital clip notes can involve passing the encrypted private digital clip notes from the first server to the second server and utilizing the second server to decrypt the encrypted private digital clip notes using the private key. Further, the series of acts 1000 can include an act of identifying clusters of encrypted private digital clip notes. In addition, the series of acts can include an act of utilizing the second server to, in parallel, decrypt the clusters of encrypted private digital clip notes and search through the clusters of decrypted private digital clip notes to identify one or more decrypted private digital clip notes that correspond to the query.

The series of acts 1000 can also involve an act of identifying a term used within the query and an act of generating, from the term used within the query, a tag to add to the private digital clip note based on identifying the private digital clip note for the query response. In one or more embodiments, the series of acts 1000 can involve an act of providing, for display within the event member interface on the client device, targeted digital content based on determining that the user has interacted with the clip note element for the co-user associated with the event.

Further, the series of acts 1000 can include an act of generating a public key and a private key, wherein the public key is stored on a first database and the private key is stored on a second database. The series of acts 1000 can include an act of, in response to a query from one or more client devices corresponding to the user: utilize the private key stored on the second database to generate decrypted private digital clip notes from the encrypted private digital private clip notes, and provide a query response to the one or more client devices based on the decrypted digital private clip notes.

In some embodiments, the series of acts 1000 includes an act of, in response to registering the user to attend the event, generating a key for encrypting and decrypting private digital clip notes based on a username associated with the user, wherein the key is generated and stored at the client device. In addition, the series of acts 1000 includes acts of encrypting the private digital clip note utilizing the key, wherein the encrypted private digital clip note is stored on a database and, in response to a query, decrypting the private digital clip note via the client device utilizing the key stored on the client device.

The series of acts 1000 can further include an act of providing, for display on the client device, a user interface including: a digital entity card comprising entity information for a corresponding entity associated with the affinity networking system and a second clip note element, within the digital entity card, and selectable for entering private digital clip notes associated with the corresponding entity. In addition, the series of acts 1000 can involve, based on user interaction with the second clip note element, generating a private digital clip note associated with the corresponding entity.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
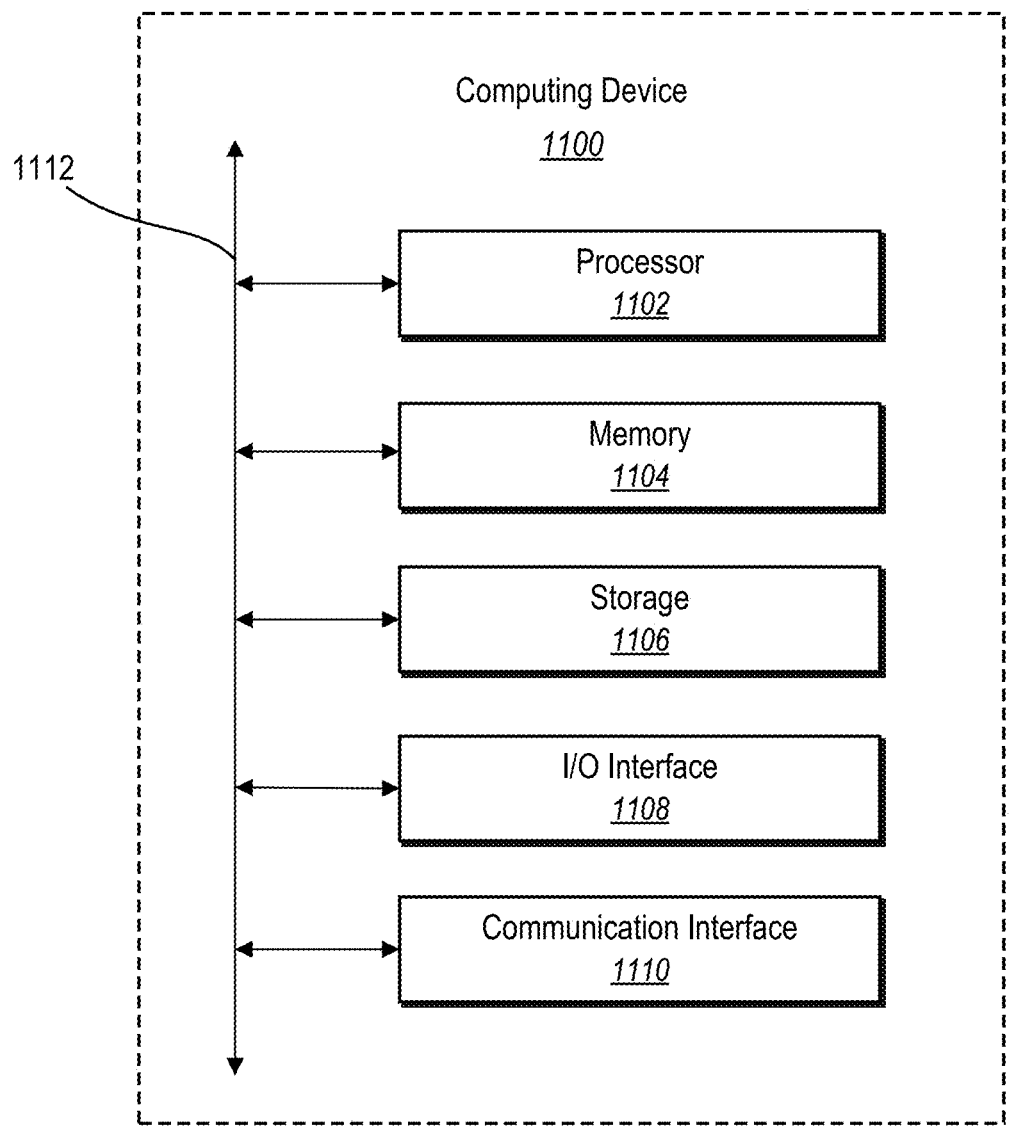
FIG. 11 illustrates a block diagram of an example computing device in accordance with one or more embodiments.

FIG. 11 illustrates, in block diagram form, an example computing device 1100 (e.g., the computing device 900, the client device(s) 110, the entity administrator device 108, the event administrator device 106, and/or the server(s) 104) that may be configured to perform one or more of the processes described above. One will appreciate that the affinity networking system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
identifying a user and one or more co-users associated with an event registered within an affinity networking system;
providing, for display on a client device associated with the user, an event member interface comprising:
one or more digital co-user cards comprising profile information for the one or more co-users associated with the event; and
a clip note element, within a digital co-user card displayed within the event member interface, wherein the clip note element is selectable for entering private digital clip notes associated with a co-user corresponding to the digital co-user card;
based on user interaction with the clip note element via the client device associated with the user, generating a private digital clip note associated with the co-user;
generating a public key and a private key, wherein the public key is stored on a first database and the private key is stored on a second database;
utilizing the public key to encrypt the private digital clip note for storage within the first database; and
in response to a query from one or more client devices corresponding to the user;
utilizing the private key stored on the second database to generate a decrypted private digital clip note from the encrypted private digital clip note; and
providing a query response to the one or more client devices based on the decrypted private digital clip note.

2. The computer-implemented method of claim 1, further comprising:
providing, for display on the client device in response to the user interaction with the clip note element, a clip note interface comprising a tag generation field for generating tags associated with the digital co-user card as part of the private digital clip note;
based on user interaction with the tag generation field, generating a tag associated with the digital co-user card; and
wherein generating the query response comprises identifying the tag within the private digital clip note and corresponding to the query.

3. The computer-implemented method of claim 1, further comprising providing, for display on the client device, an event summary interface comprising one or more digital event cards associated with one or more events registered within the affinity networking system.

4. The computer-implemented method of claim 1, further comprising generating the query response by searching, utilizing a second server associated with the second database, decrypted private digital clip notes to identify, based on the query, the private digital clip note associated with the co-user to include within the query response.

5. The computer-implemented method of claim 1, wherein generating the query response comprises:
searching private digital clip notes created by the user as well as profile information associated with co-users of the affinity networking system, company information associated with companies registered with the affinity networking system, and event information associated with events registered with the affinity networking system; and
based on the searching, identifying a digital co-user card of a co-user who attended a previous event which the user also attended.

6. The computer-implemented method of claim 1, further comprising:
providing, for display on the client device, a user interface comprising:
a digital entity card comprising entity information for a corresponding entity associated with the affinity networking system; and
a second clip note element, within the digital entity card, and selectable for entering private digital clip notes associated with the corresponding entity; and
based on user interaction with the second clip note element, generating a private digital clip note associated with the corresponding entity and comprising one or more tags for the corresponding entity.

7. The computer-implemented method of claim 1, further comprising providing, for display within the event member interface on the client device, targeted digital content based on determining that the user has interacted with the clip note element for the co-user associated with the event.

8. A system comprising:
at least one processor; and
a non-transitory computer readable medium comprising instructions that, when executed by the at least one processor, cause the system to:
provide, for display within a digital co-user card of an event member interface on a client device of a user, a clip note element for entering private digital clip notes associated with a co-user corresponding to the digital co-user card;
in response to a user interaction with the clip note element via the client device of the user, generate a private digital clip note associated with the co-user;
generate a public key and a private key, wherein the public key is stored on a first database and the private key is stored on a second database;
utilize the public key to encrypt the private digital clip note for storage within the first database; and
in response to a query from one or more client devices corresponding to the user:
utilize the private key stored on the second database to generate a decrypted private digital clip note from the encrypted private digital clip note; and
provide a query response to the one or more client devices based on the decrypted private digital private clip note.

9. The system of claim 8, further comprising instructions that, when executed by the at least one processor, cause the system to:
provide, for display on the client device, an event summary interface comprising:
one or more digital event cards associated with one or more events registered within the system;
a second clip note element, within a digital event card displayed within the event summary interface, for generating private digital clip notes associated with an event corresponding to the digital event card; and
a registration element, within the digital event card, for registering to attend the event corresponding to the digital event card.

10. The system of claim 9, further comprising instructions that, when executed by the at least one processor, cause the system to, in response to user interaction with the registration element, provide, for display on the client device, a registration interface for registering the user for the event corresponding to the digital event card.

11. The system of claim 8, further comprising instructions that, when executed by the at least one processor, cause the system to provide the query response to the one or more client devices by searching decrypted private digital clip notes generated via the private key to identify one or more decrypted private digital clip notes corresponding to the query.

12. The system of claim 8, wherein the first database is maintained by a first server and the second database is maintained by a second server separate from the first server.

13. The system of claim 12, further comprising instructions that, when executed by the at least one processor, cause the system to generate the decrypted private digital clip note by:
passing the encrypted private digital clip note from the first server to the second server; and
utilizing the second server to decrypt the encrypted private digital clip note using the private key.

14. The system of claim 13, further comprising instructions that, when executed by the at least one processor, cause the system to:
identify clusters of encrypted private digital clip notes; and
utilize the second server to, in parallel:
decrypt the clusters of encrypted private digital clip notes; and
search through the clusters of decrypted private digital clip notes to identify one or more decrypted private digital clip notes that correspond to the query.

15. A non-transitory computer readable medium comprising instructions that, when executed by at least one processor, cause a computing device to:
provide, for display on a client device associated with a user of an affinity networking system, an event summary interface comprising:
one or more digital event cards associated with one or more events registered within the affinity networking system;
a clip note element, within a digital event card displayed within the event summary interface, wherein the clip note element is selectable for entering private digital clip notes associated with an event corresponding to the digital event card;
a registration element, within the digital event card, wherein the registration element is selectable for registering the user to attend the event corresponding to the digital event card; and
an affinity element, within the digital event card, where the affinity element is selectable for indicating an affinity for the event associated with the digital event card; and
in response to user interaction with the clip note element, generate a private digital clip note comprising user-generated digital text associated with the event for storage within a database and for retrieval by one or more client devices associated with the user.

16. The non-transitory computer readable medium of claim 15, further comprising instructions that, when executed by the at least one processor, cause the computing device to:

in response to registering the user to attend the event, generate a key for encrypting and decrypting private digital clip notes based on a username associated with the user, wherein the key is generated and stored at the client device;

encrypt the private digital clip note at the client device utilizing the key, wherein the encrypted private digital clip note is stored on a database; and in response to a query, decrypt the private digital clip note via the client device utilizing the key stored on the client device to generate a query response.

17. The non-transitory computer readable medium of claim 15, further comprising instructions that, when executed by the at least one processor, cause the computing device to, in response to registering the user with the affinity networking system, generate a public key and a private key for storage on different databases associated with different servers.

18. The non-transitory computer readable medium of claim 17, further comprising instructions that, when executed by the at least one processor, cause the computing device to:

encrypt the private digital clip note utilizing the public key; and in response to a query, decrypt one or more encrypted private digital clip notes utilizing the private key.

19. The non-transitory computer readable medium of claim 15, further comprising instructions that, when executed by the at least one processor, cause the computing device to provide, for display on the client device, one or more digital co-user cards comprising profile information for one or more co-users associated with the event corresponding to the digital event card.

20. The non-transitory computer readable medium of claim 15, further comprising instructions that, when executed by the at least one processor, cause the computing device to provide, for display on the client device and in response to the user interaction with the clip note element, a clip note interface comprising:

a tag generation field for generating tags associated with the digital event card; and a text field for entering digital text-based notes associated with the digital event card.

* * * * *